(12) United States Patent
Miao et al.

(10) Patent No.: US 12,388,512 B2
(45) Date of Patent: Aug. 12, 2025

(54) PRACH (PHYSICAL RANDOM ACCESS CHANNEL) RAMPING AND DYNAMIC BEAM SWITCHING OF CONTROL AND DATA TRANSMISSIONS

(71) Applicant: Apple Inc., Cupertino, CA (US)

(72) Inventors: Honglei Miao, Munich (DE); Yushu Zhang, Beijing (CN); Yongjun Kwak, Portland, OR (US); Dae Won Lee, Portland, OR (US); Gregory V Morozov, Nizhny Novgorod (RU); Seung Hee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 542 days.

(21) Appl. No.: 17/897,281

(22) Filed: Aug. 29, 2022

(65) Prior Publication Data
US 2023/0119172 A1    Apr. 20, 2023

Related U.S. Application Data

(62) Division of application No. 16/638,025, filed as application No. PCT/US2018/045800 on Aug. 8, 2018, now abandoned.
(Continued)

(51) Int. Cl.
*H04W 52/36* (2009.01)
*H04B 7/06* (2006.01)
(Continued)

(52) U.S. Cl.
CPC .......... *H04W 52/36* (2013.01); *H04B 7/0617* (2013.01); *H04L 5/0055* (2013.01);
(Continued)

(58) Field of Classification Search
CPC ..... H04W 52/36; H04W 76/27; H04W 72/23; H04W 16/28; H04W 56/0015;
(Continued)

(56) References Cited

U.S. PATENT DOCUMENTS

2013/0215844 A1    8/2013   Seol et al.
2015/0195026 A1    7/2015   Sagong et al.
(Continued)

FOREIGN PATENT DOCUMENTS

WO    2017083514 A1    5/2017

OTHER PUBLICATIONS

3GPP RAN1 #89; R1-1709381 (Year: 2017).*
(Continued)

*Primary Examiner* — Ricky Q Ngo
*Assistant Examiner* — Stephen N Steiner
(74) *Attorney, Agent, or Firm* — Eschweiler & Potashnik, LLC; Matthew Glause

(57) ABSTRACT

Techniques discussed herein can facilitate power ramping of PRACH (Physical Random Access Channel), for example, in connection with change of best gNB (next generation Node B) Tx (Transmit) beam and/or dynamic beam switching for control and/or data channels. Power ramping techniques discussed herein can comprise techniques for determining at least one of a power ramping counter or power offset for PRACH in connection with a change in best DL (Downlink) Tx (Transmit) beam. Dynamic beam switching techniques discussed herein can comprise employing DCI comprising at least one beam indication field indicating a beam index of a new beam of a BPL (Beam Pair Link) for at least one of a data channel or a control SS (Search Space).

20 Claims, 18 Drawing Sheets

Related U.S. Application Data

(60) Provisional application No. 62/543,866, filed on Aug. 10, 2017, provisional application No. 62/543,191, filed on Aug. 9, 2017.

(51) Int. Cl.
  *H04L 5/00*     (2006.01)
  *H04W 16/28*    (2009.01)
  *H04W 56/00*    (2009.01)
  *H04W 72/044*   (2023.01)
  *H04W 72/23*    (2023.01)
  *H04W 74/0833*  (2024.01)
  *H04W 76/27*    (2018.01)
  *H04W 88/06*    (2009.01)
  *H04W 88/10*    (2009.01)

(52) U.S. Cl.
  CPC ....... *H04W 16/28* (2013.01); *H04W 56/0015* (2013.01); *H04W 72/046* (2013.01); *H04W 72/23* (2023.01); *H04W 74/0833* (2013.01); *H04W 76/27* (2018.02); *H04W 88/06* (2013.01); *H04W 88/10* (2013.01)

(58) Field of Classification Search
  CPC ........... H04W 72/046; H04W 74/0833; H04W 88/06; H04W 88/10; H04B 7/0617; H04L 5/0055
  See application file for complete search history.

(56) References Cited

U.S. PATENT DOCUMENTS

| | | | |
|---|---|---|---|
| 2018/0219606 A1* | 8/2018 | Ng | H04W 72/0453 |
| 2018/0279384 A1 | 9/2018 | Hsu | |
| 2018/0324865 A1 | 11/2018 | Hui | |
| 2019/0045494 A1* | 2/2019 | Ho | H04W 76/27 |

OTHER PUBLICATIONS

3GPP RAN1 #89; R1-1709382 (Year: 2017).*
3GPP RAN1 #89; R1-1709312 (Year: 2017).*
Huawei, HiSilicon; "DL beam management"; 3GPP TSG RAN WG1 Meeting #88b; R1-1704229; Apr. 3, 2017.
Media Tek inc.; "PRACH Msg1 retransmission"; 3GPP TSG RAN WG1 NR Ad-Hoc#2; R1-1711625; Jun. 30, 2017.
MediaTek Inc., "3GPP TSG RAN WG1 NR Ad-Hoc#2", PRACH Msg1 Retransmission: Discuss and Decision, Qingdao, P.R. China 27th, Jun. 30, 2017, p. 1-4.
Mitsubishi Electric, "3GPP TSG RAN WG1 Meeting #88bis", Agenda Item 8.1.1.4.2, Spokane, USA Apr. 3-7, 2017, p. 1-8.
Ericsson, "3GPP TSG-RAN WG1 #89ah-NR", Analysis of Beam Indication Signalling Options: Discussion and Decision, Qingdao, China Jun. 27-30, 2017, p. 1-9.
PCT Search Report dated Jan. 10, 2019 in connection with PCT Application No. PCT/US2018/045800, p. 1-8.
International Preliminary Report on Patentability dated Feb. 11, 2020 in connection with PCT Application No. PCT/US2018/045800.
Interdigital et al: "On Beam Management for DL Control and Data Channels"; 3GPP TSSG RAN WG1 Meeting #89; RI-1708334; URL:http://www.3gpp.org/ftp/tsg_ran/WG1_RL1/TSGR1_89/Docs/; May 6, 2017.
Huawei et al: "Multi-beam transmission for robustness"; 3GPP TSG RAN WG1 Meeting #89; R1-1708136; URL: http://www.3gpp.org/ftp/tsg_ran/WGI_RL1 /TSG R1_89/Docs/; May 15, 2017.
Non-Final Office Action dated May 5, 2022 in connection with U.S. Appl. No. 16/638,025.

* cited by examiner

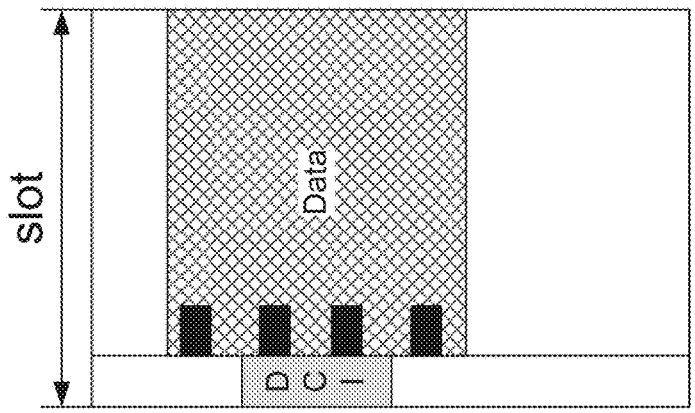
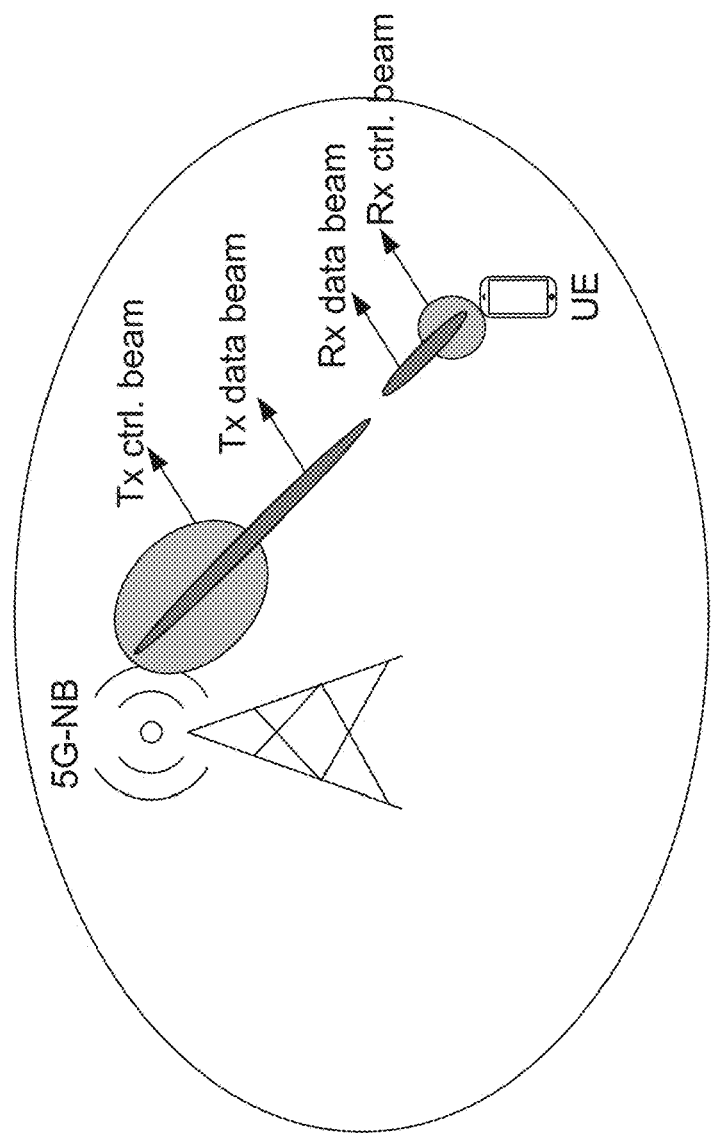
FIG. 17

ABSTRACT

PRACH (PHYSICAL RANDOM ACCESS CHANNEL) RAMPING AND DYNAMIC BEAM SWITCHING OF CONTROL AND DATA TRANSMISSIONS

REFERENCE TO RELATED APPLICATIONS

This application is a Divisional of Ser. No. 16/638,025 filed February 10, which is a National Phase entry application of International Patent Application No. PCT/US2018/045800 filed on Aug. 8, 2018, which claims the benefit of U.S. Provisional Patent Application No. 62/543,191 filed Aug. 9, 2017, entitled "DYNAMIC BEAM SWITCHING OF CONTROL AND DATA TRANSMISSIONS", and 62/543,866 filed Aug. 10, 2017, entitled "POWER RAMPING OF PHYSICAL RANDOM ACCESS CHANNEL (PRACH) FOR NEW RADIO (NR)", the contents of which are herein incorporated by reference in their entirety.

FIELD

The present disclosure relates to wireless technology, and more specifically to techniques for power ramping of a PRACH (Physical Random Access Channel), for example, in connection with switching of a best DL (Downlink) Tx (Transmit) beam, and to techniques for dynamic beam switching of control and/or data transmissions.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

FIG. 17 is a diagram illustrating an example of different BPLs applied for a control channel and a data channel, in connection with various aspects discussed herein.

DETAILED DESCRIPTION

Figure 1:
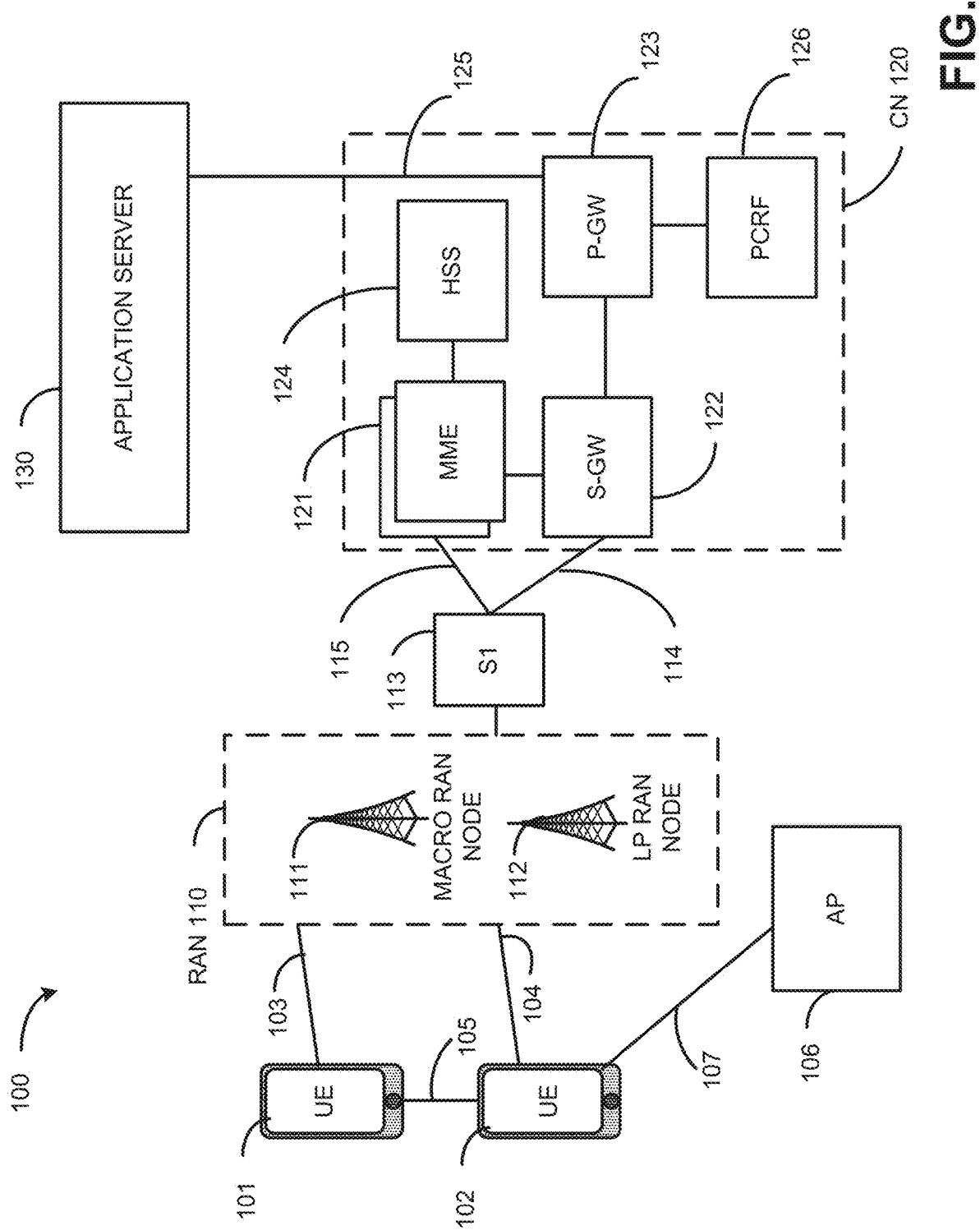
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, or 16).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
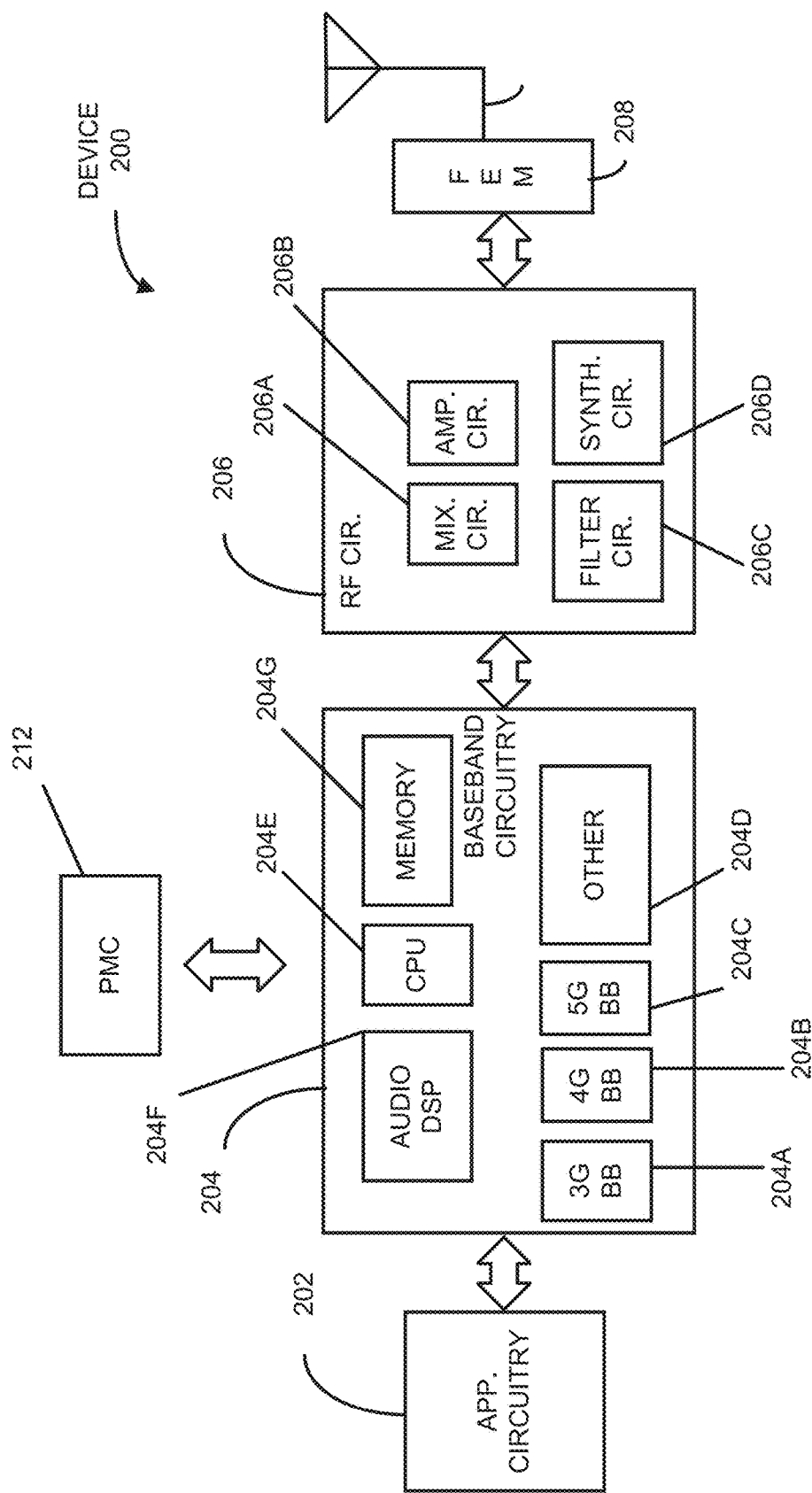
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 2 12 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
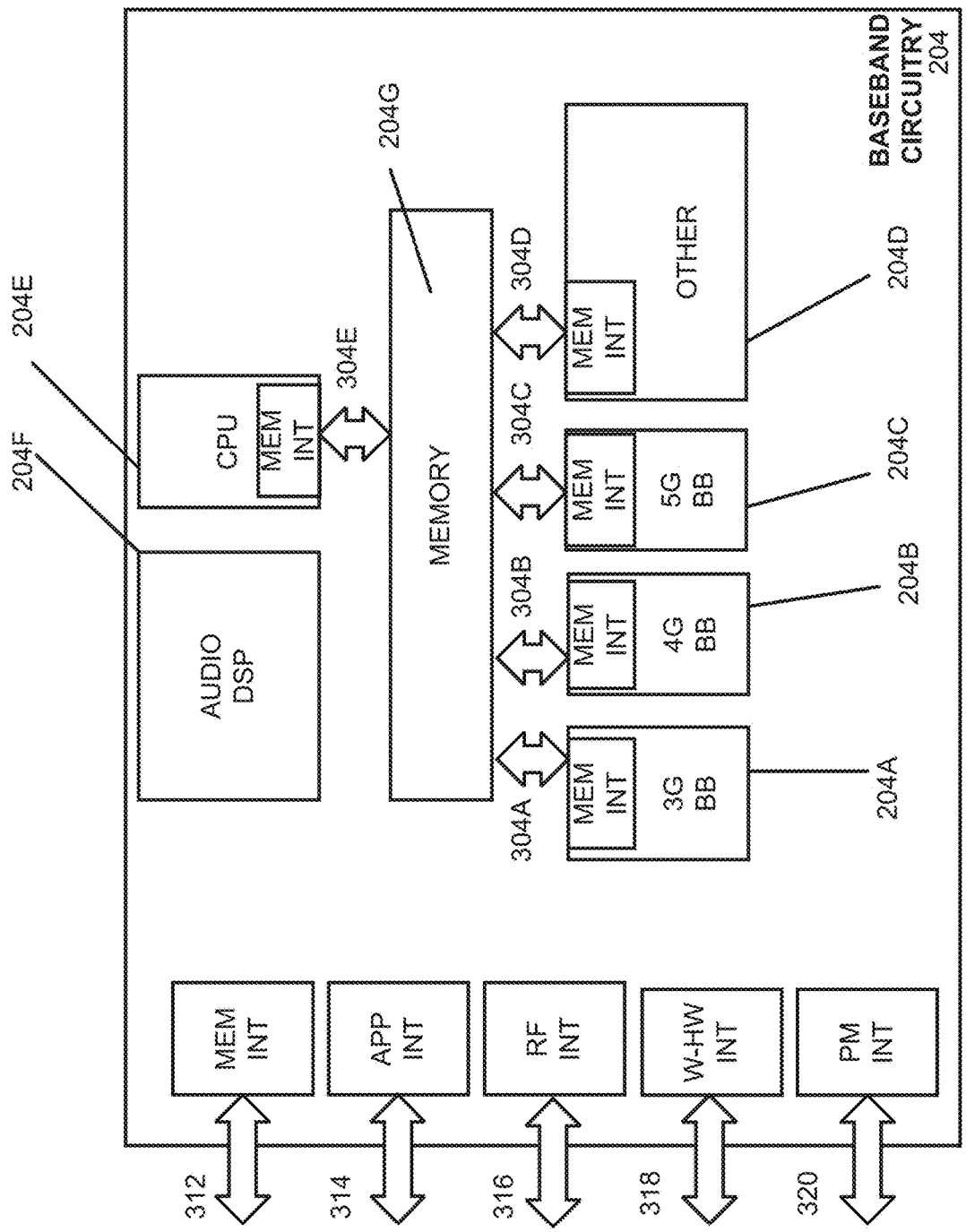
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

A first set of aspects discussed herein provides mechanisms for how to configure the transmission power of PRACH (Physical Random Access Channel) transmissions based on RACH (Random Access Channel) configurations. A second set of aspects discussed herein can relate to dynamic beam switching for control and data channels. Various embodiments discussed herein can employ techniques of the first set of aspects and/or the second set of aspects.

Figure 4:
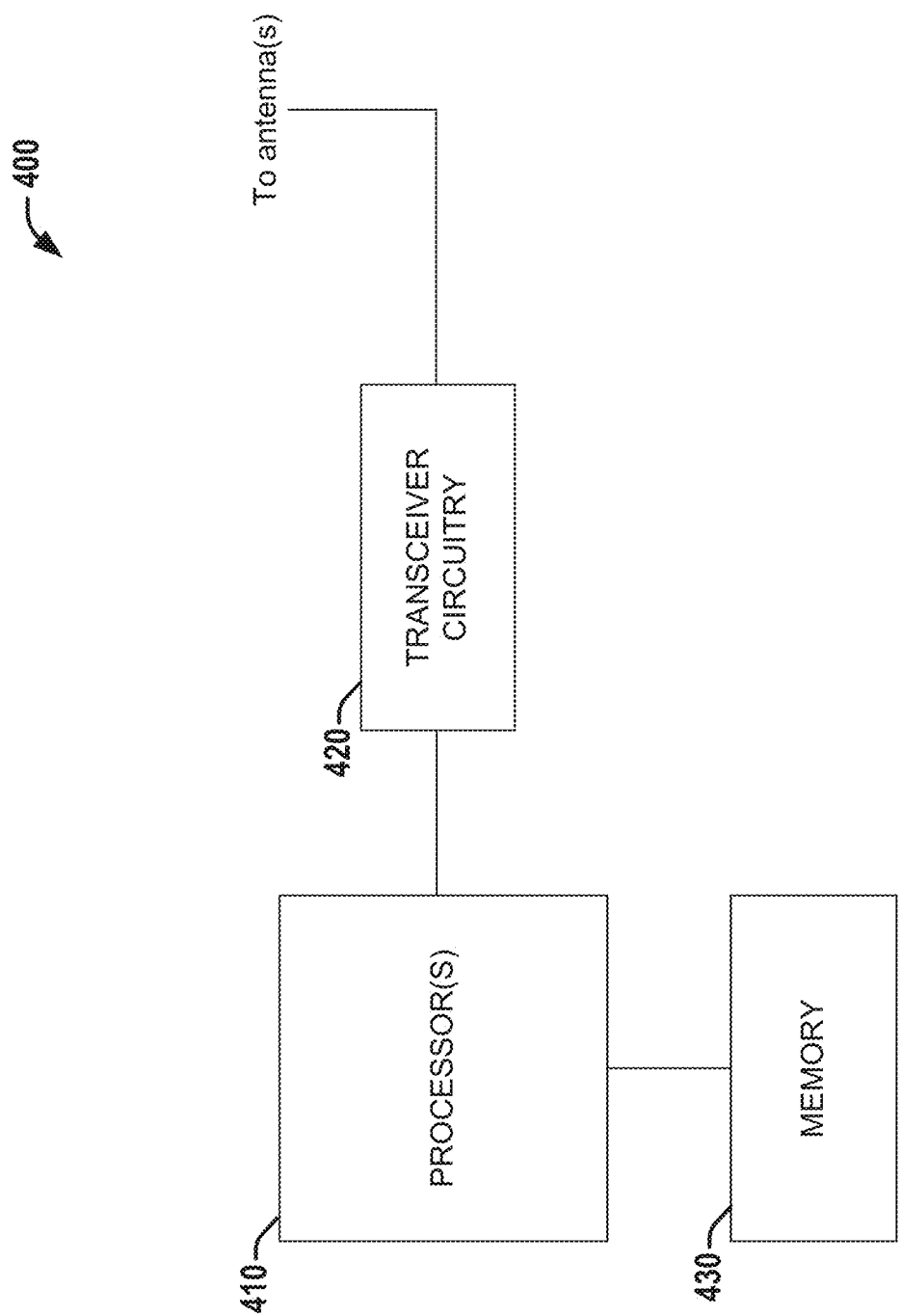
FIG. 4 is a block diagram illustrating a system employable at a UE (User Equipment) that facilitates power ramping and/or dynamic beam switching techniques discussed herein, according to various aspects described herein.

Referring to FIG. 4, illustrated is a block diagram of a system 400 employable at a UE (User Equipment) that facilitates power ramping and/or dynamic beam switching techniques discussed herein, according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate techniques described herein associated with the first set of aspects and/or the second set of aspects.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
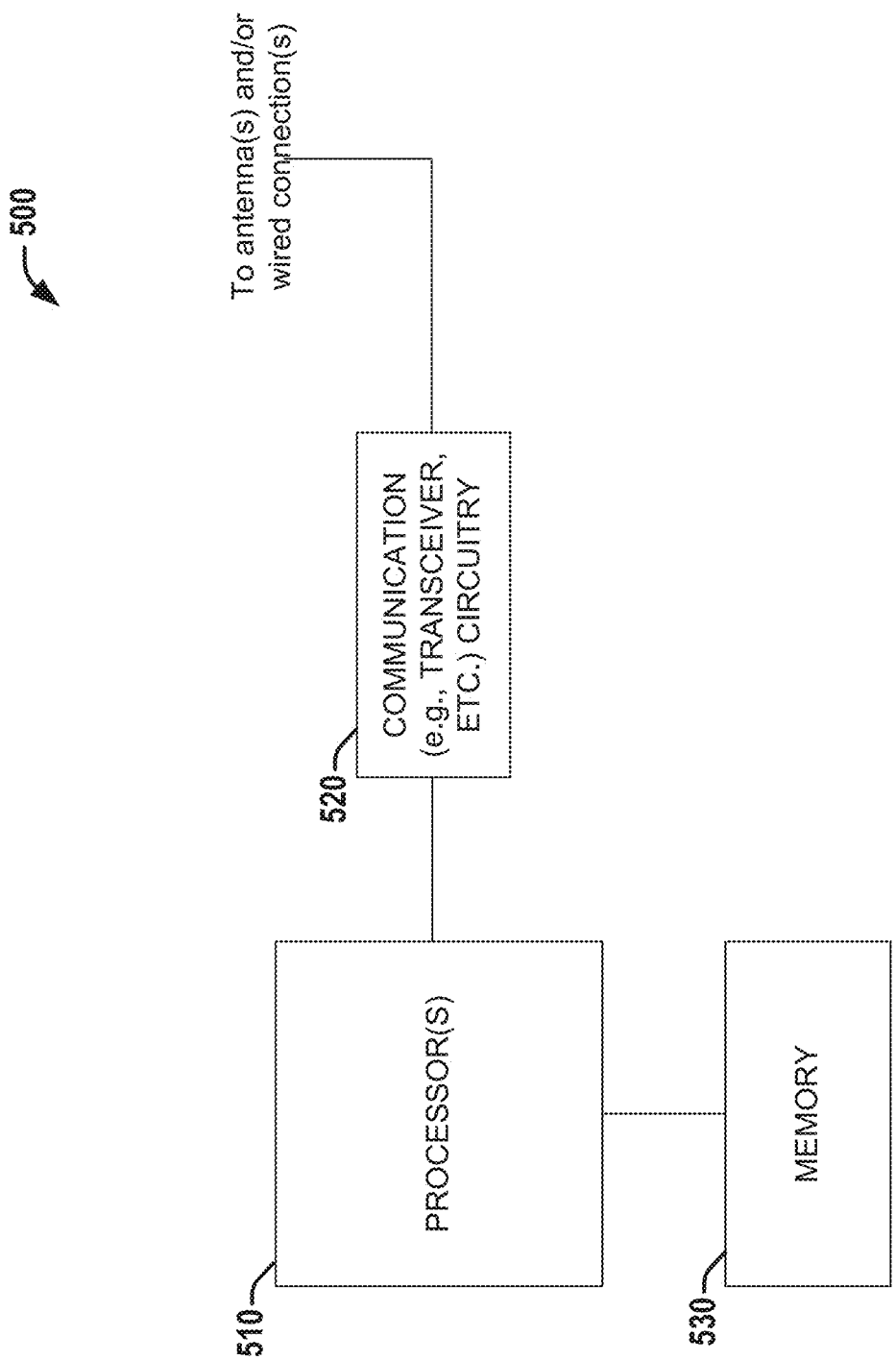
FIG. 5 is a block diagram illustrating a system employable at a BS (Base Station) that facilitates power ramping and/or dynamic beam switching techniques discussed herein, according to various aspects described herein.

Referring to FIG. 5, illustrated is a block diagram of a system 500 employable at a BS (Base Station) that facilitates power ramping and/or dynamic beam switching techniques discussed herein, according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate techniques discussed herein in connection with the first set of aspects and/or the second set of aspects.

Power Ramping of Physical Random Access Channel (PRACH) for New Radio (NR)

Existing techniques do not provide proper UE behavior for the RACH (Random Access Channel) retransmissions if the best SS (Synchronization Signal) block changes during retransmissions. A first set of aspects discussed herein (and embodiments employing those aspects) relates to configuration of the transmission power of PRACH transmissions based on the RACH configurations. Such techniques and embodiment can be efficiently employed for PRACH in multi-beam scenarios.

Figure 6:
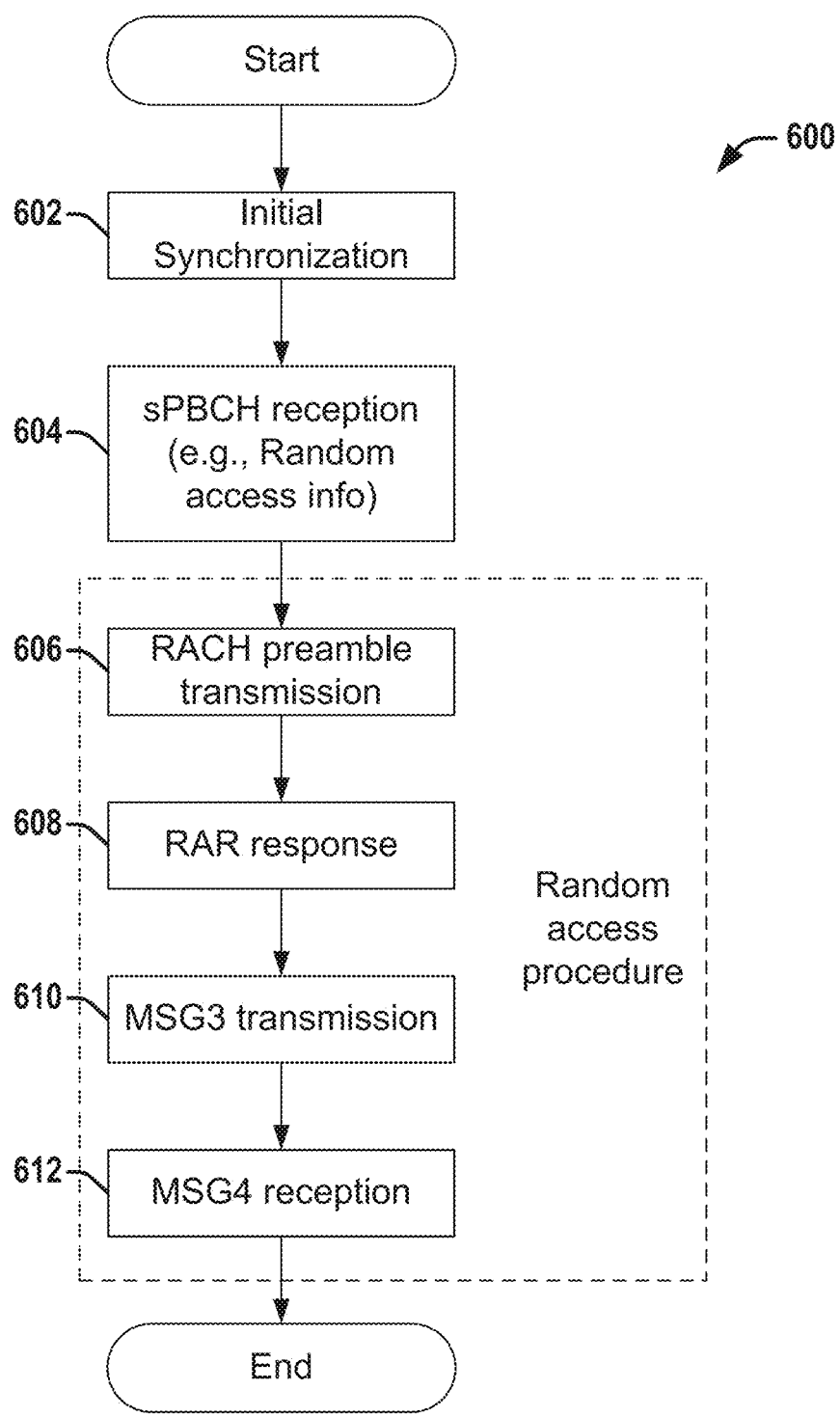
FIG. 6 is a diagram illustrating an initial access procedure to be performed by a UE to establish a connection with a RAN (Radio Access Network), in connection with various aspects discussed herein.

At the 3GPP (Third Generation Partnership Project) RAN1 (RAN (Radio Access Network) WG1 (Working Group 1)) NR Ad Hoc in January 2017 and RAN1 #89 in May 2017, the following agreements were made with regard to PRACH power ramping:

1) At RAN1 Ad Hoc:
   a) Whether UE performs UL (Uplink) Beam switching during retransmissions is up to UE implementation
      i) Note: which beam UE switches to is up to UE implementation 2) At Rani #89:
   a) If the UE conducts beam switching, the counter of power ramping remains unchanged
      i) FFS (For Further Study): UE behavior after reaching the maximum power The agreements at RAN1 Ad Hoc and RAN1 #89 are regarding the power ramping of retransmissions of PRACH (e.g., generated by processor(s) 410, transmitted via transceiver circuitry 420, received via communication circuitry 520, and processed by processor(s) 510). For a UE (e.g., employing system 400) to make a connection with a cell, it has to perform an initial access procedure. Referring to FIG. 6, illustrated is a diagram of an initial access procedure to be performed by a UE to establish a connection with a RAN, in connection with various aspects discussed herein. When a UE starts the initial access, it can first perform initial synchronization by detecting (e.g., via processor(s) 410) synchronization signals (e.g., received via transceiver circuitry 420) at 602 and can sequentially receive (e.g., via transceiver circuitry 420) system information at 604 to have at least random access procedure configuration information. After that, at 606-612, the UE can perform the random access procedure. For the random access procedure, the UE can initially transmit PRACH (Msg-1 (Message 1)) at 606 (e.g., generated by processor(s) 410, transmitted via transceiver circuitry 420, received via communication circuitry 520, and processed by processor(s) 510) and attempt to receive Random Access Response (RAR) (Msg-2) at 608. If there is no RAR received by the UE inside a pre-defined (or configured) time window, the UE can retransmit PRACH (e.g., generated by processor(s) 410, transmitted via transceiver circuitry 420, received via communication circuitry 520, and processed by processor(s) 510) with different power until it receives RAR. If the UE receives RAR (e.g., generated by processor(s) 510, transmitted via communication circuitry 520, received via transceiver circuitry 420, and processed by processor(s) 410) at 608, then the UE can transmit Msg-3 (e.g., generated by processor(s) 410, transmitted via transceiver circuitry 420, received via communication circuitry 520, and processed by processor(s) 510) at 610 and can receive the Msg-4 (e.g., generated by processor(s) 510, transmitted via communication circuitry 520, received via transceiver circuitry 420, and processed by processor(s) 410) at 612, which ends the initial access procedure.

If a UE has multiple analog beams and beam correspondence between transmission and reception is not available, then the UE can either change the transmission beam for the retransmission of PRACH (e.g., generated by processor(s) 410, transmitted via transceiver circuitry 420, received via communication circuitry 520, and processed by processor(s) 510) or increase the transmission power (e.g., via processor(s) 410 and transceiver circuitry 420) for retransmission of the PRACH (e.g., generated by processor(s) 410, transmitted via transceiver circuitry 420, received via communication circuitry 520, and processed by processor(s) 510). Based on the agreements discussed above, the change of the Tx (Transmit) beam is up to UE implementation. If the UE changes the Tx beam (e.g., via processor(s) 410 selecting and transceiver circuitry 420 applying a new set of beamforming weights), then the power ramping counter of the UE can remain unchanged, which means it can use the same or similar power (e.g., as selected by processor(s) 410 and applied via transceiver circuitry 420) for the PRACH transmission as employed for the previous PRACH transmission. If the UE does not change the Tx beam, then its power ramping counter can be increased by one and the UE can increase power (e.g., via processor(s) 410 and transceiver circuitry 420) for the PRACH retransmission, wherein the power of the PRACH retransmission can be based at least in part on the power ramping counter.

Mechanisms to Set the Power Ramping Counter Depending on PRACH Resources

In multi-beam operation, there are synchronization signals (e.g., generated by processor(s) 510, transmitted via communication circuitry 520, received via transceiver circuitry 420, and processed by processor(s) 410) from multiple antennas in a base station (e.g., gNB, eNB, etc.) using a beam sweeping manner. If a UE detects (e.g., via processor(s) 410) a synchronization signal (e.g., received via transceiver circuitry 420) from a certain beam, then there can be one PRACH resource associated with the beam of the detected synchronization signal. In such scenarios, the UE can use the PRACH resource for the transmission of the PRACH (e.g., generated by processor(s) 410, transmitted via transceiver circuitry 420, received via communication circuitry 520, and processed by processor(s) 510). Depending on the beam of the detected synchronization signal, the UE can use the different PRACH resources for the PRACH sequences.

Figure 7:
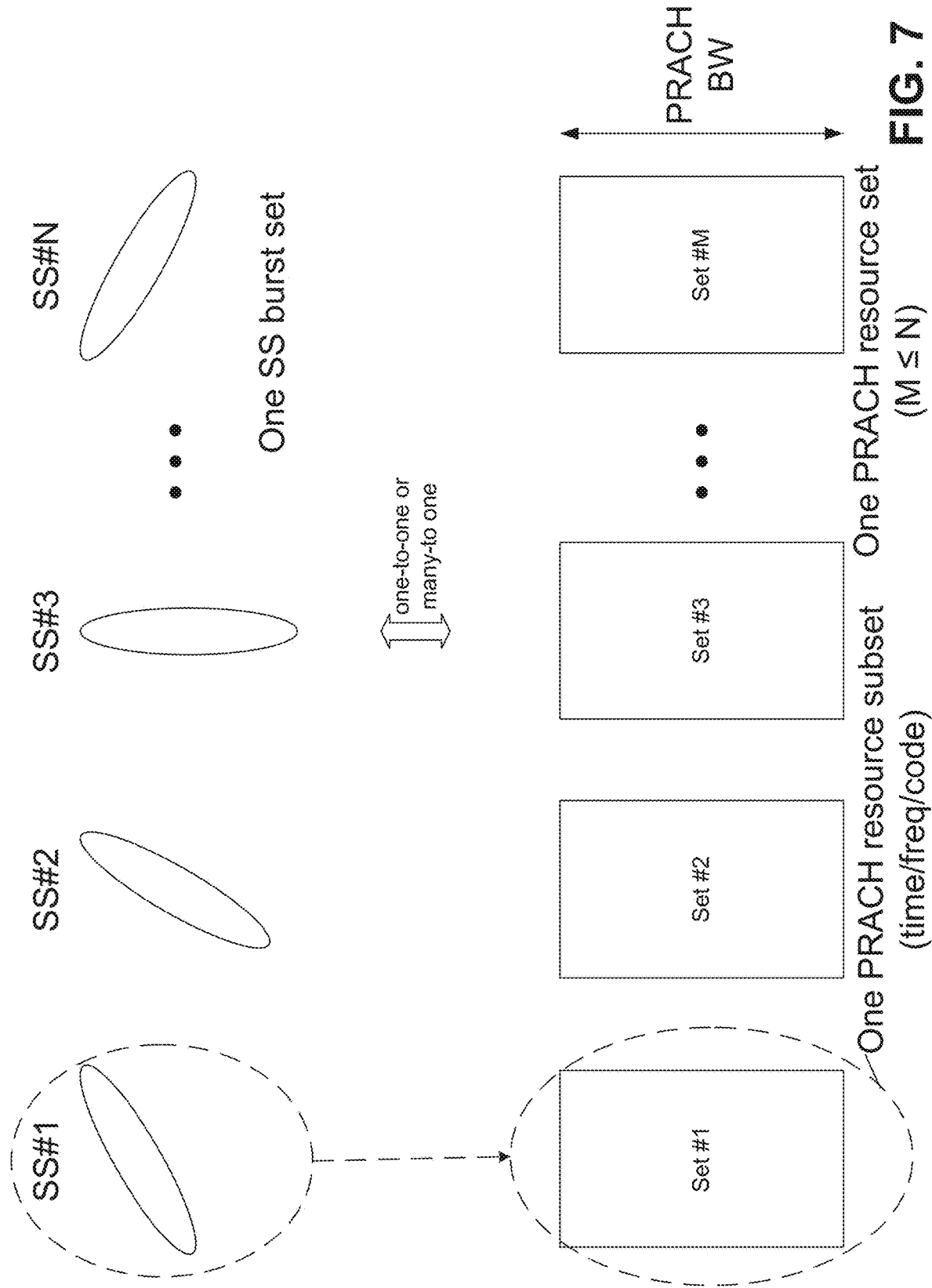
FIG. 7 is a diagram illustrating the PRACH (Physical Random Access Channel) resource configuration association with synchronization signal(s), according to various aspects discussed herein.

Referring to FIG. 7, illustrated is a diagram of the PRACH resource configuration association with synchronization signal(s), according to various aspects discussed herein. In various aspects, a base station (e.g., gNB, etc.) can use multiple synchronization signal blocks (SS blocks) (e.g., generated by processor(s) 510, transmitted via communication circuitry 520, received via transceiver circuitry 420, and processed by processor(s) 410) for one or more of the downlink transmission beam. For each beam, there can be one PRACH resource subset configured by system information (e.g., generated by processor(s) 510, transmitted via communication circuitry 520, received via transceiver circuitry 420, and processed by processor(s) 410). A UE can attempt to detect (e.g., via processor(s) 410) the SS block (e.g., received via transceiver circuitry 420) and can determine (e.g., via processor(s) 410) the best SS block (e.g., based on the highest received signal according to some metric). Based on the best SS block, the UE can use the PRACH resource subset associated with the best SS block for the transmission of PRACH (e.g., generated by processor(s) 410, transmitted via transceiver circuitry 420, received via communication circuitry 520, and processed by processor(s) 510). At the NR base station (gNB) side, by receiving PRACH (e.g., generated by processor(s) 410, transmitted via transceiver circuitry 420, received via communication circuitry 520, and processed by processor(s) 510), the BS can determine that the best Tx beam for the UE which transmitted the PRACH is the Tx beam used for the SS block associated with the PRACH resource subset where the PRACH was received.

Figure 8:
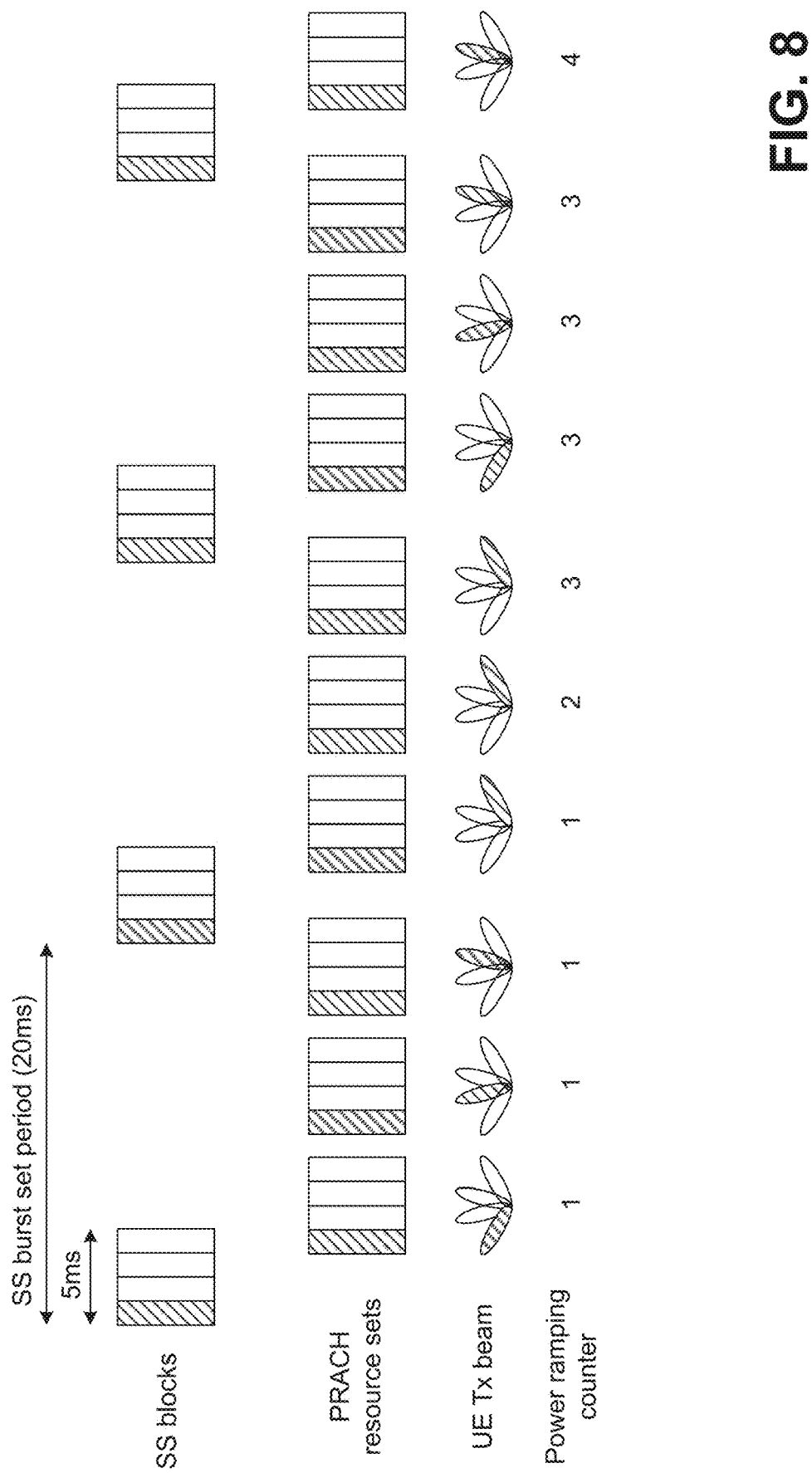
FIG. 8 is a diagram illustrating an example PRACH resource configuration and associated UE behavior for power ramping, according to various aspects discussed herein.

If a UE detects (e.g., via processor(s) 510) a SS block (e.g., generated by processor(s) 510, transmitted via communication circuitry 520, received via transceiver circuitry 420, and processed by processor(s) 410), the UE can transmit the PRACH (e.g., generated by processor(s) 410, transmitted via transceiver circuitry 420, received via communication circuitry 520, and processed by processor(s) 510) on the RPACH resource subset which is associated with the detected SS block. Referring to FIG. 8, illustrated is a diagram showing an example PRACH resource configuration and associated UE behavior for power ramping, according to various aspects discussed herein. By detecting (e.g., via processor(s) 410) the best SS block (e.g., the diagonally hatched SS block out of the SS burst set) of SS block(s) received (e.g., via transceiver circuitry 420), the UE can select the corresponding PRACH resource subset(s) (the diagonally hatched subset) for transmission of the PRACH (e.g., generated by processor(s) 410, transmitted via transceiver circuitry 420, received via communication circuitry 520, and processed by processor(s) 510). If the UE does not receive the random access response (RAR) after the transmission of PRACH, it can transmit PRACH (e.g., generated by processor(s) 410, transmitted via transceiver circuitry 420, received via communication circuitry 520, and processed by processor(s) 510) again in the next PRACH subset. If the UE changes the beam in the retransmission of PRACH, then it can skip increasing the power ramping counter. However, if the UE uses the same beam in the retransmission of PRACH, then it can increase the power ramping counter by 1 as shown in FIG. 8.

In FIG. 8, it can be assumed that during the multiple transmissions of PRACH from a UE, the best SS block is not changed. However, it is possible that the best SS block can be changed for a UE while it is transmitting PRACH using either a different beam or increased power.

Figure 9:
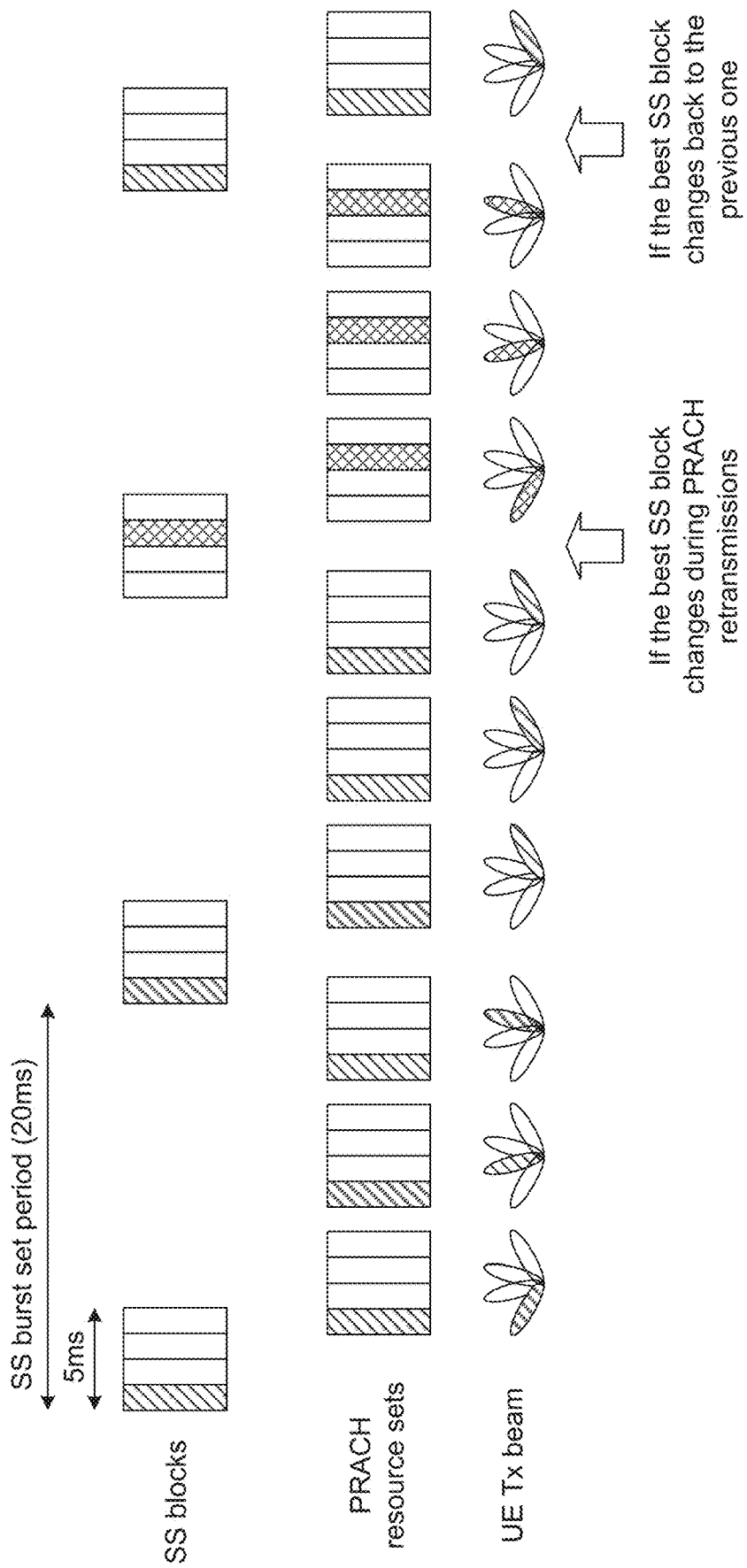
FIG. 9 is a diagram illustrating an example PRACH resource configuration and associated UE behavior for power ramping with change of the best DL (downlink) beam, according to various aspects discussed herein.

Referring to FIG. 9, illustrated is a diagram showing an example PRACH resource configuration and associated UE behavior for power ramping with change of the best DL (downlink) beam, according to various aspects discussed herein. In the example of FIG. 9, after the sixth transmission of PRACH (e.g., generated by processor(s) 410, transmitted via transceiver circuitry 420, received via communication circuitry 520, and processed by processor(s) 510), the best SS block is changed from the first SS block to the third SS block. Additionally, in FIG. 9, after the ninth transmission of PRACH (e.g., generated by processor(s) 410, transmitted via transceiver circuitry 420, received via communication circuitry 520, and processed by processor(s) 510), the best SS block is changed back to the first SS block. In existing techniques, the UE behavior on PRACH transmissions is not clear in such scenarios.

Figure 10:
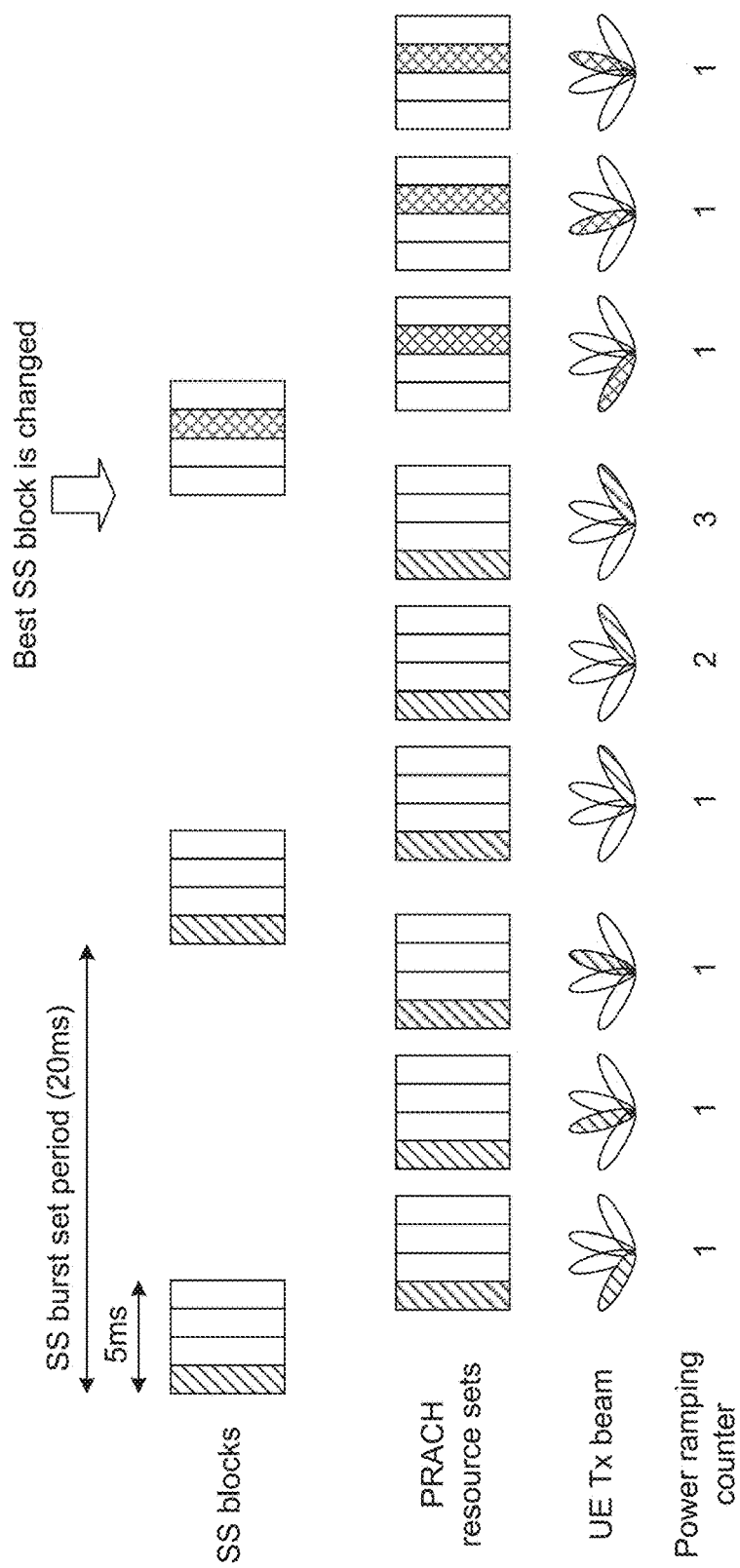
FIG. 10 is a diagram illustrating an example of PRACH transmission being reset after a change in the best SS block, according to various aspects discussed herein.

In a first set of embodiments of the first set of aspects, if the best SS block is changed, then the PRACH transmission is reset. In such embodiments, the UE can just neglect the previous PRACH transmission, and it can transmit the PRACH (e.g., generated by processor(s) 410, transmitted via transceiver circuitry 420, received via communication circuitry 520, and processed by processor(s) 510) from the initial transmission. In such a scenario, the power ramping counter can be reset (e.g., via processor(s) 510) to 1 for all beams, and if there is no RAR (e.g., generated by processor(s) 510, transmitted via communication circuitry 520, received via transceiver circuitry 420, and processed by processor(s) 410) for the PRACH transmission, the UE can either change the Tx beam (e.g., via processor(s) 410 and transceiver circuitry 420) while keeping the power ramping counter or can use the same Tx beam with the power ramping counter increased by 1. Referring to FIG. 10, illustrated is diagram showing an example of PRACH transmission being reset after a change in the best SS block, according to various aspects discussed herein.

Figure 11:
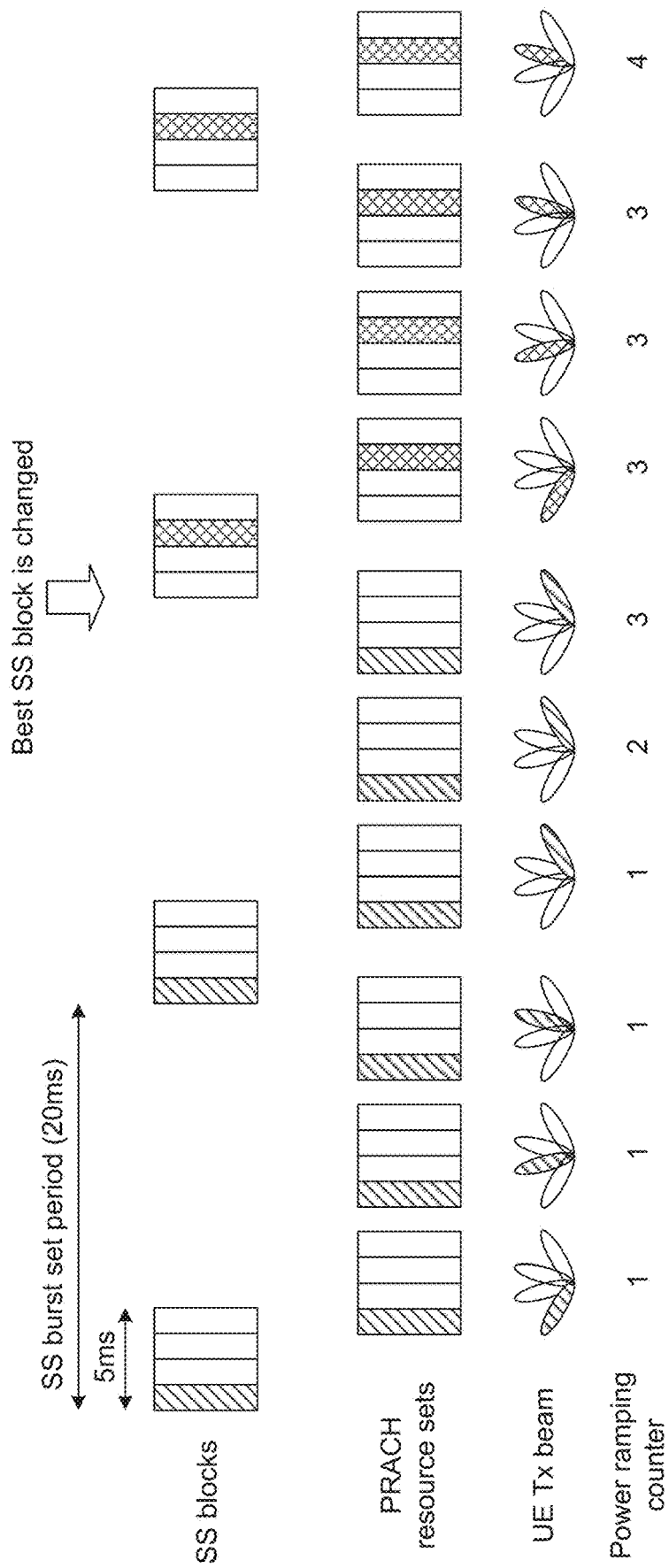
FIG. 11 is a diagram illustrating an example of a PRACH transmission behavior that is independent of change in the best SS block, according to various aspects discussed herein.

In a second set of embodiments of the first set of aspects, if the best SS block is changed, the UE can maintain the same behavior on the power ramping counter (e.g., via processor(s) 410 and transceiver circuitry 420). In such embodiments, the UE can change the PRACH resource subset (e.g., via processor(s) 410) according to the new best SS block, but the transmission of PRACH (e.g., generated by processor(s) 410, transmitted via transceiver circuitry 420, received via communication circuitry 520, and processed by processor(s) 510) can be based on the previous PRACH transmission. Thus, if the UE changes the Tx beam, then the power ramping counter can remain the same. If the UE uses the same Tx beam, then the power ramping counter can be increased by 1 (e.g., via processor(s) 410 and transceiver circuitry 420). Referring to FIG. 11, illustrated is an example diagram of PRACH transmission behavior that is independent of change in the best SS block, according to various aspects discussed herein.

Figure 12:
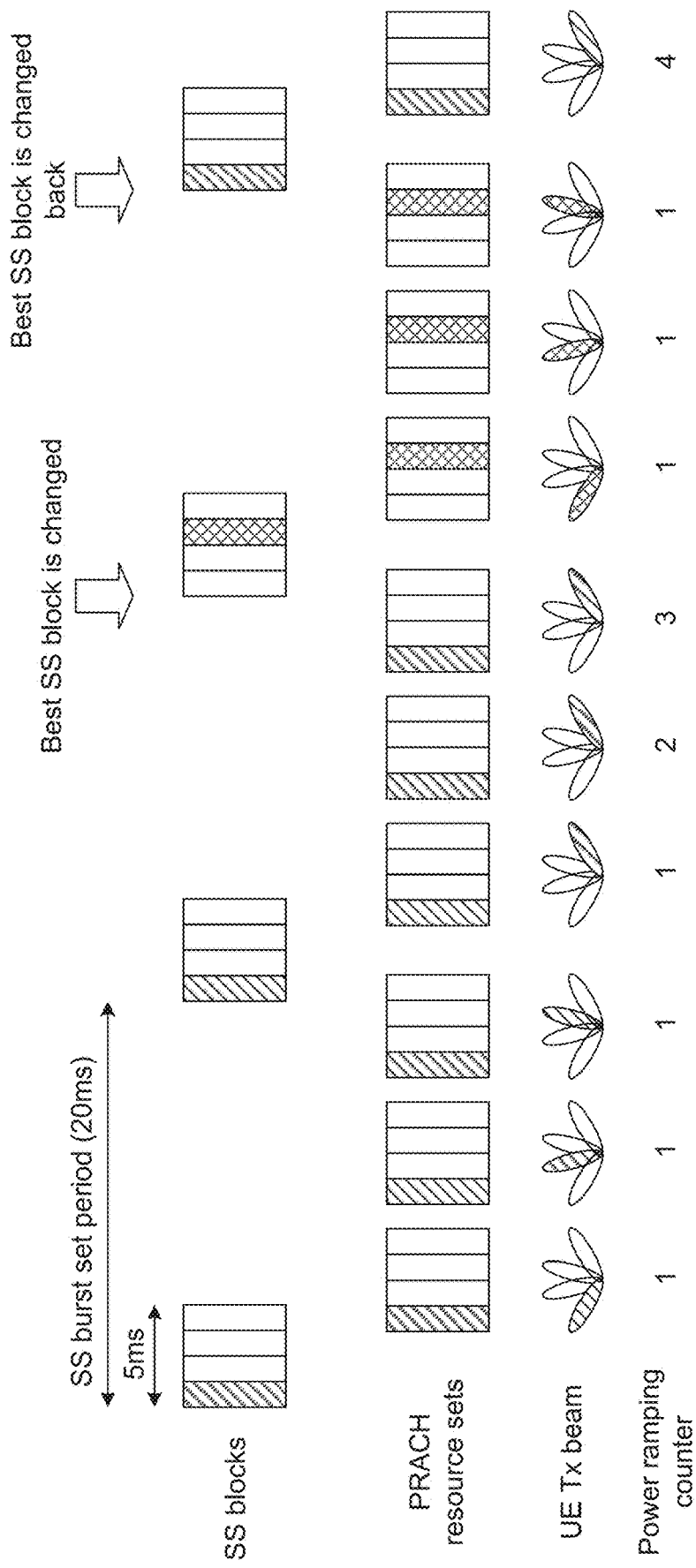
FIG. 12 is a diagram illustrating an example of a PRACH transmission behavior involving change of PRACH subset based on a change in the best SS block, according to various aspects discussed herein.

In a third set of embodiments of the first set of aspects, if the best SS block is changed, then the UE can reset (e.g., via processor(s) 410) the PRACH transmission behavior, for example, at least on the power ramping counter. The UE can change (e.g., via processor(s) 410) the PRACH resource subset according to the new best SS block and can reset (e.g., via processor(s) 410) the power ramping counter to 1 for the transmission of PRACH (e.g., generated by processor(s) 410, transmitted via transceiver circuitry 420, received via communication circuitry 520, and processed by processor(s) 510) in the new PRACH resource subset. After that, if the UE changes the Tx beam (e.g., via processor(s) 410 and transceiver circuitry 420), then the power ramping counter remains the same. If the UE uses the same Tx beam, then the power ramping counter can be increased by 1 (e.g., via processor(s) 410 and transceiver circuitry 420). Referring to FIG. 12, illustrated is an example diagram of a PRACH transmission behavior involving change of PRACH subset based on a change in the best SS block, according to various aspects discussed herein. In FIG. 12, when the best SS block is changed from the first SS block to the third SS block, then the power ramping counter is reset to 1 (e.g., via processor(s) 410 and transceiver circuitry 420).

However, in the third set of embodiments of the first set of aspects, if the best SS block is changed back to the previous best SS block, then the UE behavior can be different from the first or second sets of embodiments. In FIG. 12, when the best SS block is changed back to the first SS block, then the UE can retain the previous power ramping counter and use it as the reference (e.g., via processor(s) 410). In FIG. 12, before the best SS block changed to the third SS block, the last power ramping counter was 3. Then when the best SS block changes from the third SS block back to the first SS block, the power ramping counter can be based on the previous power ramping counter (which was 3) and the following power ramping counter can be determined.

In addition, in aspects, an additional counter can be defined (e.g., counter_A) for determining validity of the previous power ramping counter. If the best SS block is changed, then the counter_A can be set (e.g., via processor(s) 410). If the best SS block is changed back (e.g., via processor(s) 410) to the previous best SS block, if the counter_A is larger than a certain threshold, then the previously used power ramping counter is not valid, and it can be reset (e.g., via processor(s) 410) to 1. However, if the counter_A is not larger than the threshold, then the UE can assume (e.g., via processor(s) 410) that the previously used power ramping counter when the best SS block is the first one (as in FIG. 12) is valid, and the power ramping counter can be updated (e.g., via processor(s) 410) based on this previous value.

In a fourth set of embodiments of the first set of aspects, if the best SS block is changed, then the UE can reduce (e.g., via processor(s) 410) the power ramping counter by a certain amount (e.g., by a non-negative integer). The UE can change the PRACH resource subset according to the new best SS block and can reduce (e.g., via processor(s) 410) the power ramping counter by a certain amount X (e.g., for X an integer≥0) for the transmission of PRACH in the new PRACH resource subset. If the power ramping counter is smaller than (X+1), then the power ramping counter can be reset (e.g., via processor(s) 410) to 1. In other words, the power ramping counter can be Max(1, P−X), where P is the latest power ramping counter.

After that, if the best SS block is not changed again and the UE changes the Tx beam, then the power ramping counter remains the same. If the UE uses the same Tx beam, then the power ramping counter should be increased by 1. The value X can be one of fixed in the specification (e.g., as a pre-determined integer X≥0), configured by UE-specific RRC (Radio Resource Control) (e.g., generated by processor(s) 510, transmitted via communication circuitry 520, received via transceiver circuitry 420, and processed by processor(s) 410), or configured by system information (e.g., remaining minimum system information (RMSI) or other system information (OSI) generated by processor(s) 510, transmitted via communication circuitry 520, received via transceiver circuitry 420, and processed by processor(s) 410).

In a fifth set of embodiments of the first set of aspects, if the best SS block is changed, then the UE can reduce the power (e.g., via processor(s) 410 and transceiver circuitry 420) by a certain amount of power offset. The UE can change (e.g., via processor(s) 410) the PRACH resource subset according to the new best SS block and can maintain (e.g., via processor(s) 410) the power ramping counter but decrease the power (e.g., via processor(s) 410 and transceiver circuitry by Y dB (for Y≥0) for the transmission of PRACH (e.g., generated by processor(s) 410, transmitted via transceiver circuitry 420, received via communication circuitry 520, and processed by processor(s) 510) in the new PRACH resource subset. After that, if the best SS block is not changed again and the UE changes (e.g., via processor(s) 410 and transceiver circuitry 420) the Tx beam, then the power ramping counter can remain the same (e.g., as determined by processor(s) 410). If the UE uses the same Tx beam, then the power ramping counter can be increased by 1 (e.g., via processor(s) 410). The value Y can be one of fixed in the specification (e.g., as a pre-determined value Y≥0), configured by UE-specific RRC (Radio Resource Control) (e.g., generated by processor(s) 510, transmitted via communication circuitry 520, received via transceiver circuitry 420, and processed by processor(s) 410), or configured by system information (e.g., remaining minimum system information (RMSI), or other system information (OSI) generated by processor(s) 510, transmitted via communication circuitry 520, received via transceiver circuitry 420, and processed by processor(s) 410).

Figure 13:
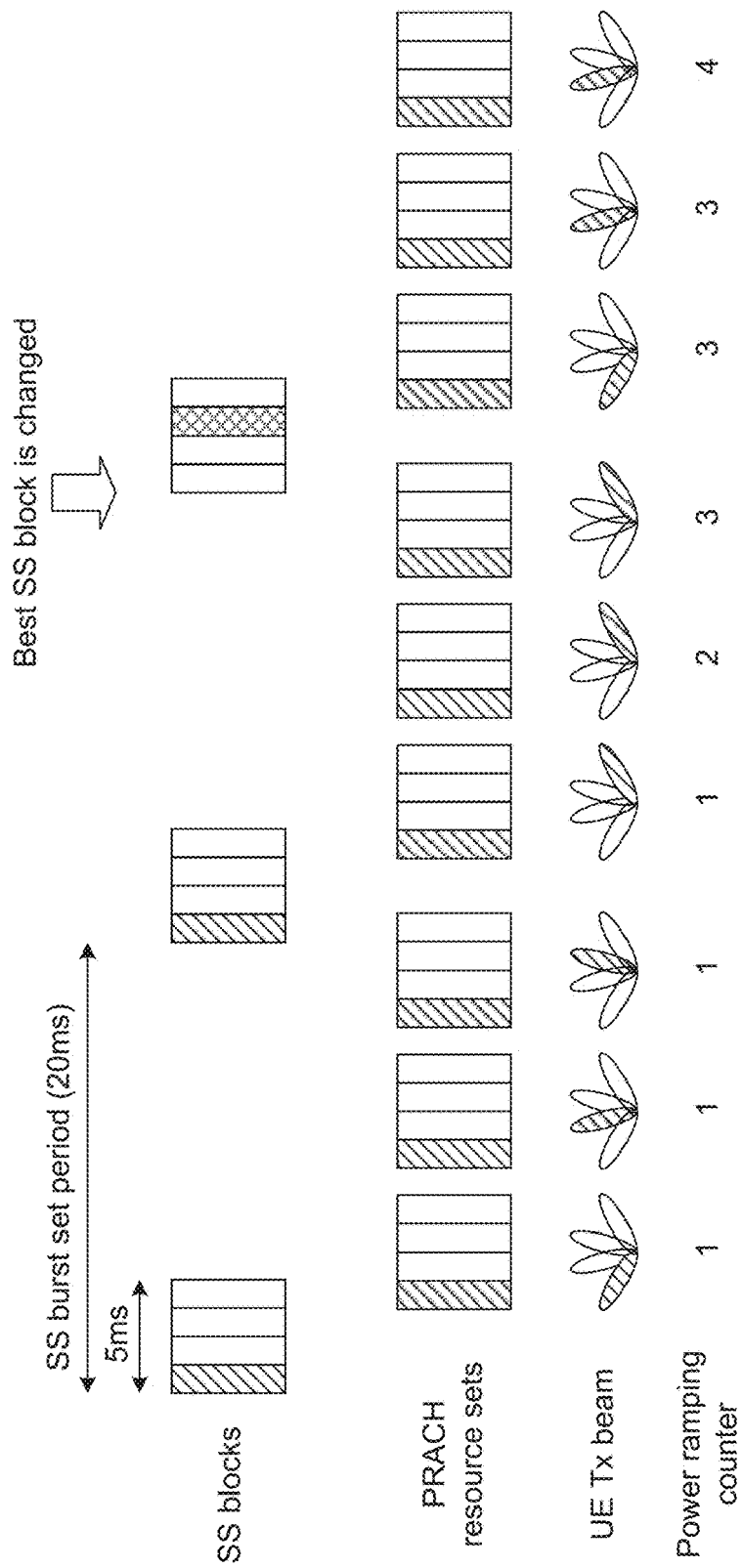
FIG. 13 is a diagram illustrating an example of a PRACH transmission behavior without change of PRACH subset based on a change in the best SS block, according to various aspects discussed herein.

In a sixth set of embodiments of the first set of aspects, if the best SS block is changed, the UE does not change the PRACH resource set. UE just use the same PRACH resource set that was initially chosen for the first transmission of PRACH until the end of the PRACH operation. Referring to FIG. 13, illustrated is an example diagram of a PRACH transmission behavior without change of PRACH subset based on a change in the best SS block, according to various aspects discussed herein.

In a seventh set of embodiments of the first set of aspects, the Rx beam configuration can be considered. If there are multiple Rx beams on the gNB side, then the gNB can perform Rx beamforming (e.g., via processor(s) 510 and communication circuitry 520) for the detection of PRACH using multiple Rx beams. Since the number of maximum Rx beams can be very large, one single PRACH format may not support all possible numbers of Rx beams at the gNB side.

Figure 14:
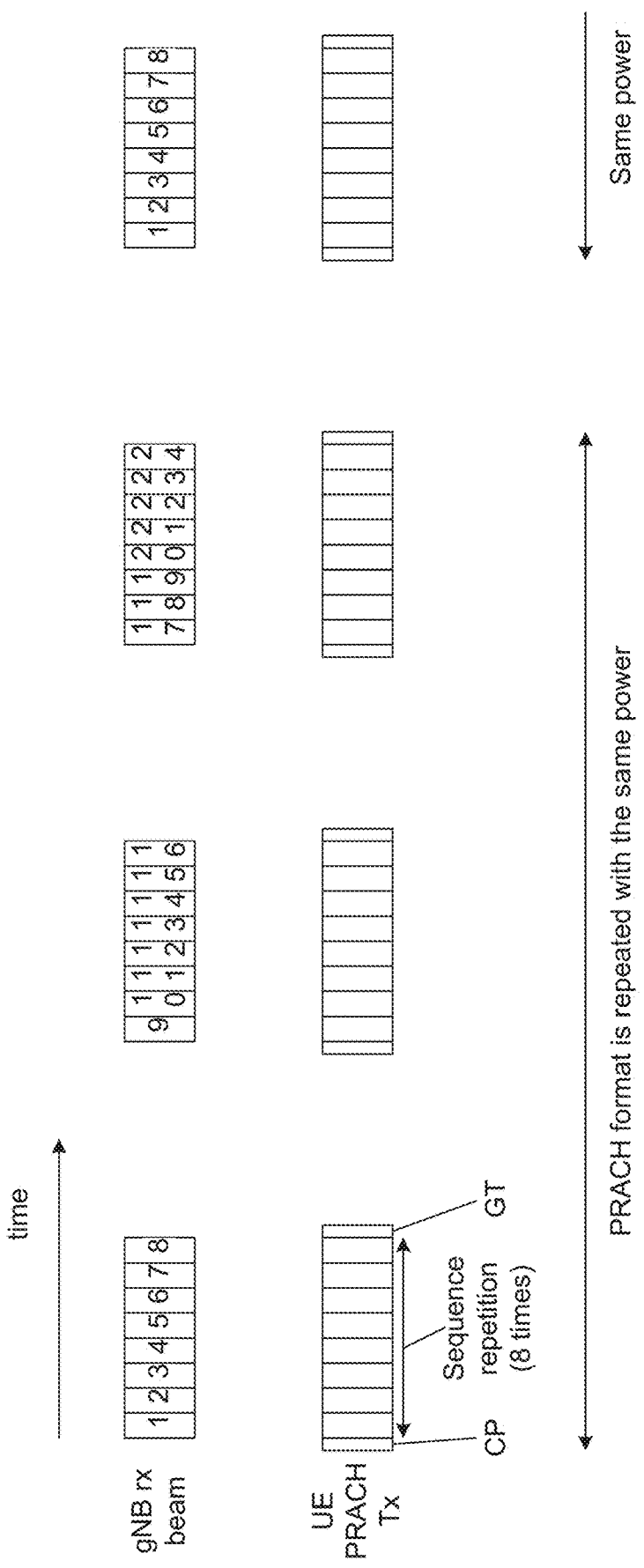
FIG. 14 is a diagram illustrating an example technique for PRACH support for a large number of gNB receive beams, according to various aspects discussed herein.

In such scenarios, a UE can transmit the PRACH formats multiple times (e.g., generated by processor(s) 410, transmitted via transceiver circuitry 420, received via communication circuitry 520, and processed by processor(s) 510) to cover all the Rx beams at the gNB side, and in such scenarios, power ramping can be omitted (e.g., by processor(s) 410) even though the UE is using the same UE Tx beam. Referring to FIG. 14, illustrated is a diagram of an example technique for PRACH support for a large number of gNB receive beams, according to various aspects discussed herein. In the example of FIG. 14, the gNB has 24 Rx beams, but the PRACH format with the largest sequence repetition supports only 8 Rx beams. In such a scenario, the UE can transmit the PRACH format of 8 repeated sequences (e.g., generated by processor(s) 410, transmitted via transceiver circuitry 420, received via communication circuitry 520, and processed by processor(s) 510) 3 times without power ramping on those 3 consecutive PRACH transmissions. The gNB can use the first 8 Rx beams for the first PRACH reception, can use Rx beams 9 to 16 for the second PRACH reception, and can use the remaining Rx beams for the third PRACH reception.

Since the UE does not know how many times to transmit the PRACH format without power ramping, in various aspects, signaling (e.g., generated by processor(s) 510, transmitted via communication circuitry 520, received via transceiver circuitry 420, and processed by processor(s) 410) can be employed to indicate this information in addition to the PRACH format. In various embodiments, one or more of the following can be signaled to the UE:

1) Number of Rx beams in gNB side: based on this information, the UE can implicitly calculate (e.g., via processor(s) 410) how many times to repeat the transmission of PRACH without power ramping;
2) The number of PRACH repetitions without the UE can use this number for the repetition of PRACH without power ramping;
3) The combination of multiple PRACH formats during the transmission without power ramping (e.g., which can include PRACH format K, format L, format M) for the UE to transmit without power ramping; and/or
4) Other information.

The signaling (e.g., generated by processor(s) 510, transmitted via communication circuitry 520, received via transceiver circuitry 420, and processed by processor(s) 410) can be done by one of or combination of physical broadcast channel (PBCH), remaining minimum system information (RMSI), other system information (OSI), Radio Resource Control (RRC) signaling, or Medium Access Control (MAC) signaling.

In various such embodiments, the UE can maintain a common Tx beam for the whole repetition of the PRACH transmission. For example, if the gNB configures 3 transmissions of PRACH without power ramping, the UE can maintain the same Tx beam during the transmissions of 3 consecutive PRACH.

In a seventh set of embodiments of the first set of aspects, the gNB can indicate (e.g., via signaling generated by processor(s) 510, transmitted via communication circuitry 520, received via transceiver circuitry 420, and processed by processor(s) 410) a maximum number of repetitions for PRACH. However, the repetitions can depend on the number of Tx beam inside a UE. In such embodiments, there are multiple options for signaling the maximum repetition number and corresponding UE behavior. In various embodiments, one or more of the following options can be employed.

1) Option 1: the gNB can signal (e.g., via signaling generated by processor(s) 510, transmitted via communication circuitry 520, received via transceiver circuitry 420, and processed by processor(s) 410) one Max_repetition_PRACH value. The UE can employ (e.g., via processor(s) 410) the signaled value regardless of the number of UE Tx beams or number of gNB Rx beams. If the UE transmits PRACH (e.g., generated by processor(s) 410, transmitted via transceiver circuitry 420, received via communication circuitry 520, and processed by processor(s) 510) the maximum number times, the UE can stop repetition and can restart the RACH procedure from the beginning (e.g., via processor(s) 410 and transceiver circuitry 420).
2) Option 2: the gNB can signal (e.g., via signaling generated by processor(s) 510, transmitted via communication circuitry 520, received via transceiver circuitry 420, and processed by processor(s) 410) one Max_repetition_PRACH value. The UE can calculate (e.g., via processor(s) 410) the actual possible repetitions of PRACH depending on its Tx beam(s). If the UE has a single Tx beam, when the UE repeats the PRACH transmissions Max_repetition_PRACH times, the UE can stop repetition and can restart the RACH procedure from the beginning (e.g., via processor(s) 410 and transceiver circuitry 420). If the UE has N Tx beams, when the UE repeats the PRACH transmissions N×Max_repetition_PRACH times, then it can stop repetition and can restart the RACH procedure from the beginning (e.g., via processor(s) 410 and transceiver circuitry 420).
3) Option 3: the gNB can signal (e.g., via signaling generated by processor(s) 510, transmitted via communication circuitry 520, received via transceiver circuitry 420, and processed by processor(s) 410) one Max_repetition_PRACH value. The UE can calculate (e.g., via processor(s) 410) the actual possible repetitions of PRACH depending on gNB Rx beam(s). If the UE has to transmit PRACH multiple times (e.g., M times) to cover all the gNB Rx beams, the UE can assume (e.g., via processor(s) 410) M×Max_repetition_PRACH is the maximum number of repetitions. Thus, once the UE has repeated PRACH transmissions M×Max_repetition_PRACH times, then it can stop repetition and can restart the RACH procedure from the beginning (e.g., via processor(s) 410 and transceiver circuitry 420).

Figure 15A:
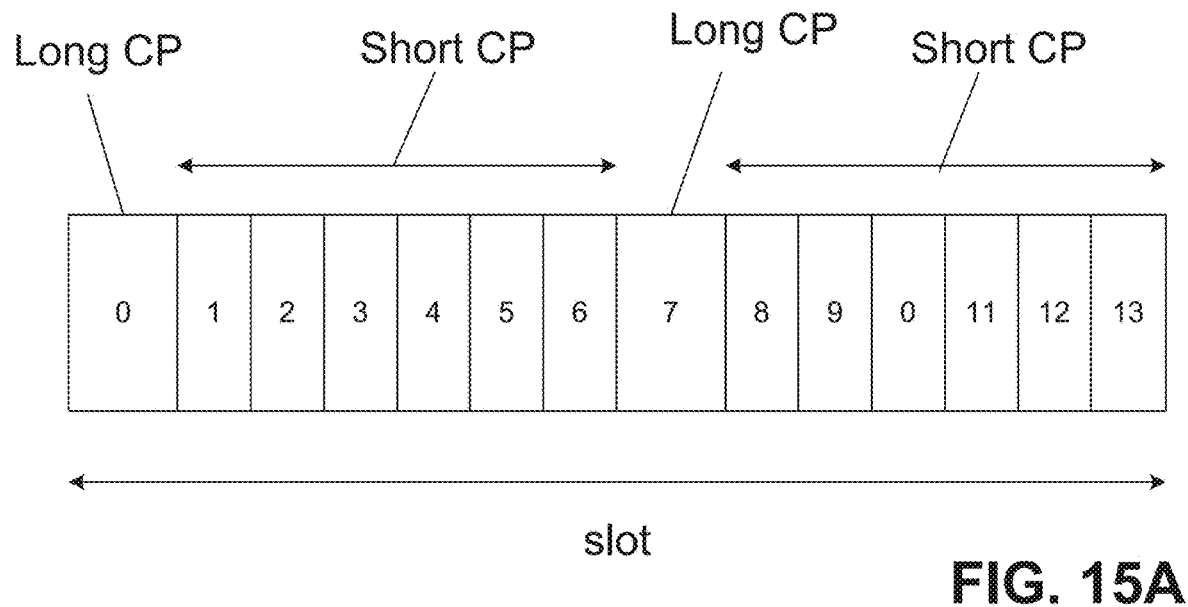
FIG. 15A is a diagram illustrating an example scenario wherein there are different sizes of cyclic prefixes in different symbols in the same slot, in connection with various aspects discussed herein.

In an eighth set of embodiments of the first set of aspects, the PRACH format can be different depending on the position of the OFDM (Orthogonal Frequency Division Multiplexing) symbols. Referring to FIG. 15A, illustrated is a diagram showing an example scenario wherein there are different sizes of cyclic prefixes in different symbols in the same slot, in connection with various aspects discussed herein. In the example of FIG. 15A, there are 14 OFDM (or SC (Single Carrier)-FDMA (Frequency Division Multiple Access), etc.) symbols inside a single slot, with symbols #0 and #7 having longer CP and other symbols having shorter CP. Thus, depending on the location of the symbol inside a slot, the PRACH format can be different.

Figure 15B:
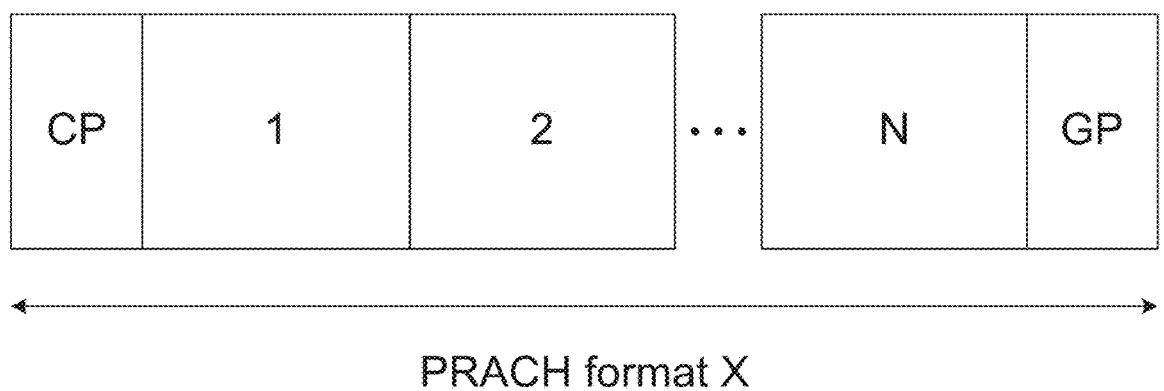
FIG. 15B is a diagram illustrating an example PRACH format that can be employed by a UE, according to various aspects discussed herein.

Referring to FIG. 15B, illustrated is a diagram showing an example PRACH format that can be employed by a UE, according to various aspects discussed herein. FIG. 15B shows an example PRACH format (referred to herein as PRACH format X) assuming N repetitions, wherein N can be a positive integer. There can be a CP (Cyclic prefix) located at the beginning of the first symbol and a GP (guard period) located at the end of the last symbol. In various aspects, the CP can be either at the beginning of the first symbol or at the end of the last symbol and the GP also can be either in the beginning of the first symbol or at the end of the last symbol.

The CP length of the PRACH format (e.g., the example PRACH format of FIG. 15B) can be different from the CP of a normal OFDM symbol (e.g., the symbols of FIG. 15A, etc.). In various embodiments, PRACH format X can occupy M number of normal OFDM symbols, where N is distinct from M. For example, if the PRACH format X occupies 5 normal OFDM symbols, then depending on the location of the PRACH format X, the length can be different. As one specific example in connection with the example slot of FIG. 15A, if the PRACH format X is located from OFDM symbol 0 to 4, then the length can be the sum of 1 OFDM symbol of long CP and 4 OFDM symbols of short CP. As another specific example in connection with the slot of FIG. 15A, if the PRACH format X is located from OFDM symbol 2 to 6, then the length is sum of 5 OFDM symbols of short CP. In various embodiments, the length of PRACH format X can be adjusted (e.g., via processor(s) 410) depending on the symbols locations, according to one of several options: (1) the CP length can be fixed and the GP length can vary depending on the location inside a slot; (2) the CP length can vary and the GP length can be fixed depending on the location inside a slot; or (3) the CP length and the GP length can vary depending on the location inside a slot.

Figure 16:
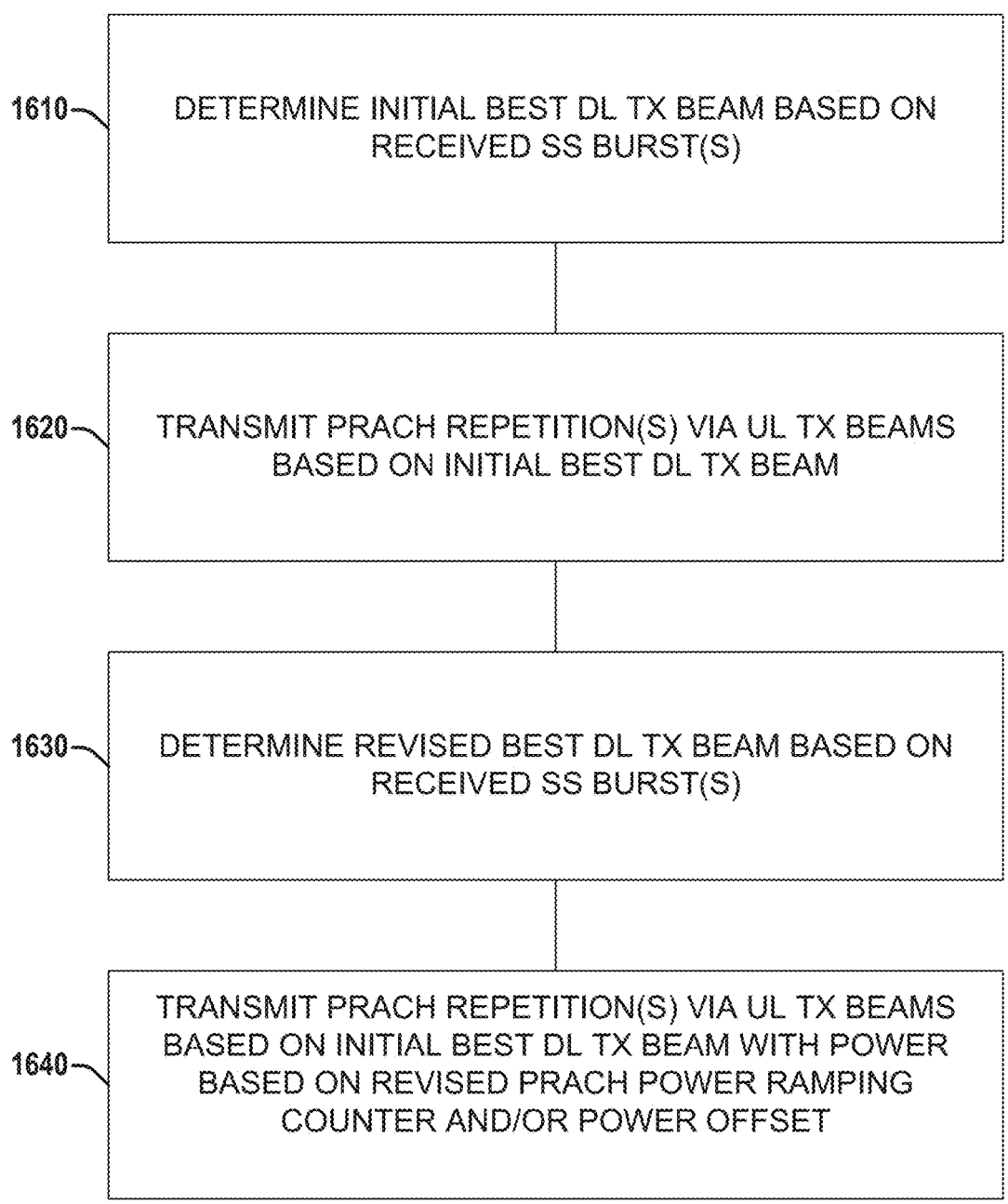
FIG. 16 is a flow diagram illustrating an example method employable at a UE that facilitates power ramping in connection with PRACH, according to various aspects discussed herein.

Referring to FIG. 16, illustrated is a flow diagram of an example method 1600 employable at a UE that facilitates power ramping in connection with PRACH, according to various aspects discussed herein. In other aspects, a machine readable medium can store instructions associated with method 1600 that, when executed, can cause a UE to perform the acts of method 1600.

At 1610, an initial best DL (Downlink) Tx beam can be determined based on a first set of one or more received SS (Synchronization Signal) bursts.

At 1620, a first set of one or more repetitions of PRACH can be transmitted via multiple UL (Uplink) Tx beams based on the initial best DL Tx beam.

At 1630, a revised best DL Tx beam can be determined based on a second set of one or more received SS bursts, wherein the initial best DL Tx beam is distinct from the revised best DL Tx beam.

At 1640, a second set of one or more repetitions of the PRACH can be transmitted based on the revised best DL Tx beam, wherein a power of the second set of one or more repetitions is based on at least one of: a revised PRACH power ramping counter determined based on a current value of the PRACH power ramping counter for the initial best DL Tx beam, or a PRACH power offset.

Additionally or alternatively, method 1600 can include one or more other acts described herein in connection with various embodiments of system 400 discussed herein in connection with the first set of aspects.

Dynamic Beam Switching of Control and Data Transmissions

In 3GPP 5G new radio system, dynamic beam switching for physical data and control channel transmission is supported. Specifically, for data channel transmission, the dynamic beam indication is included in the scheduling control channel associated with the data channel. For dynamic beam switching of control channel among configured set of beams, similar to LTE (Long Term Evolution) EPDCCH (Enhanced Physical Control Channel), beam switching can be readily realized (e.g., via processor(s) 410) by using the control channel from the search space (SS) configured with the desired beam direction. For example, three control channel SSes are configured for the UE, each of which can be configured with a downlink reference signal (RS) assumed to be quasi-colocated (QCLed) with the demodulation reference signal (DMRS) of the control channel in terms of large scale channel parameters in the time, frequency and space domains. In addition to RRC-based reconfiguration of the beam direction (i.e., the QCLed DL RS) of the SS, it is also agreed in 3GPP that the beam direction of SS can be dynamically reconfigured by MAC (Medium Access Control)-CE (Control Element). However, existing 3GPP systems leave open the questions of whether and how the dynamic beam re-configuration of SS can be signaled by the control channel itself so that the beam switching can be realized more dynamically than MAC-CE based reconfiguration. Dynamic beam re-configuration (e.g., according to embodiments of the second set of aspects) can be beneficial if the UE is quickly entering some un-configured control beam coverage.

Figure 18:
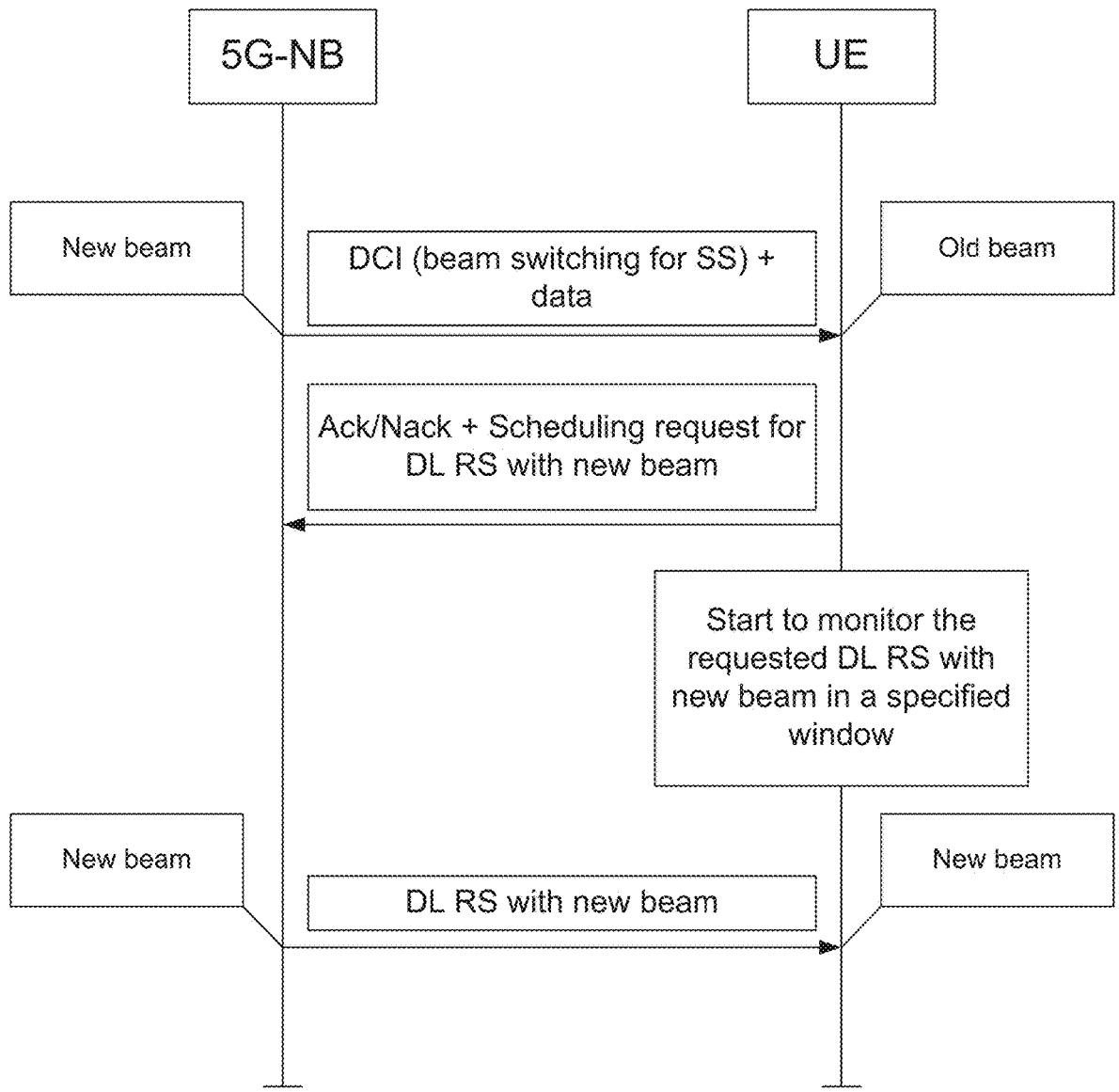
FIG. 18 is a flow diagram illustrating an example method employable at a UE that facilitates dynamic reconfiguration of a control channel SS, according to various aspects discussed herein.

By virtue of the beam management procedure in new radio system, UE can simultaneously maintain one or several Tx-Rx beam pair links (BPLs) which define the proper beam alignment association between certain Tx-Rx beamforming filter settings. In some deployment scenarios, it is possible that the same set of BPLs is used for control and data transmission. However in other scenarios, due to different requirements of beamforming gain and beam tracking overhead, the BPLs maintained for control and data channels can be different. For instance, a smaller number of BPLs with wider beamwidth can be maintained for control channel(s) than those for data channel(s). Referring to FIG. 17, illustrated is a diagram showing an example of different BPLs applied for a control channel and a data channel, in connection with various aspects discussed herein. As shown in the example of FIG. 18, a control channel (e.g., generated by processor(s) 510, transmitted via communication circuitry 520, received via transceiver circuitry 420, and processed by processor(s) 410) transmitted with wide beam schedules a data channel (e.g., generated by processor(s) 510, transmitted via communication circuitry 520, received via transceiver circuitry 420, and processed by processor(s) 410) with narrow beam. In some deployment scenarios, the control and data channels can be transmitted from distinct TRPs (Tx/Rx Points). In such scenarios, when an analog beamformer is employed at the UE (e.g., by processor(s) 410 and transceiver circuitry 420), due to the decoding delay of the control channel, it may not be possible for the UE to apply (e.g., via processor(s) 410 and transceiver circuitry 420) different receive beamformer filter settings signaled by the control channel for the scheduled data channel immediately after the respective control channel. In particular, front-loaded DMRS, in which the DMRS are placed in the first symbols of the scheduled data slot, is now agreed in 3GPP. If a different Rx beamformer setting is to be applied for data from that for control, and the DMRS of scheduled data are transmitted immediately after the control (e.g., generated by processor(s) 510, transmitted via communication circuitry 520, received via transceiver circuitry 420, and processed by processor(s) 410), channel estimates obtained (e.g., via processor(s) 410) from the receiver with improper Rx beamformer settings cannot be easily used for coherent demodulation of the scheduled data. Therefore, some timer based beam switching activation delay has been suggested. In addition, such timer based beam switching activation delay has also been proposed for beam switching reconfiguration of the control channel SS. Although a timer based method may work in many cases, it can be problematic, especially in scenarios wherein transmission errors occur, leading to a risk of beam misalignment between NW and UE. Moreover, the timer proposed for beam switching activation delay seems to be a L2 (Layer 2) timer which may not run with the same timing granularity of the L1 operation, for example, at least on the OFDM symbol level. The resulting beam switching may not operate as rapidly as necessary for the physical layer.

In various embodiments employing the second set of embodiments, a comprehensive signaling framework discussed herein can be employed (e.g., by a system 400 and/or system 500) to handle the dynamic beam switching for data and control channel in a UE-specific manner on an OFDM symbol timing basis. As a result, beam switching can be realized in a more agile way than the timer based method.

In various embodiments of the second set of embodiments, separate or common beam indication field(s) can be added (e.g., by processor(s) 510) to the downlink control information (DCI) (e.g., generated by processor(s) 510, transmitted via communication circuitry 520, received via transceiver circuitry 420, and processed by processor(s) 410) to dynamically signal the updated beam index for scheduled data as well as the control channel SS. In some such embodiments, via a flag indicating whether the beam switching is applied to control SS or data, a common beam indication field can be used for both control and data beam switching, as needed. Compared to separate beam indication, common beam indication techniques discussed herein can reduce the DCI signaling overhead.

Additionally, in various embodiments, an adjustable starting OFDM symbol position in the scheduled data transmission can be employed to enable the beam switching activation delay required by control channel decoding and analog beamformer operation setting at the UE.

In various embodiments employing the second set of aspects, a signaling procedure can be employed that comprises: (a) data scheduling with beam switching indication (e.g., via DCI generated by processor(s) 510, transmitted via communication circuitry 520, received via transceiver circuitry 420, and processed by processor(s) 410), (b) an ACK (Acknowledgement)/NACK (Negative Acknowledgement) response (e.g., generated by processor(s) 410, transmitted via transceiver circuitry 420, received via communication circuitry 520, and processed by processor(s) 510) with scheduling request of DL RS with new beam, and (c) DL RS with new beam transmission (e.g., generated by processor(s) 510, transmitted via communication circuitry 520, received via transceiver circuitry 420, and processed by processor(s) 410), which can reconfigure the BPL setting of control channel SS. The hand-shake process built-in the above three part approach reduces the possibility of beam misalignment due to transmission errors or data loss.

By attaching the SS index to the control SS beam indication, in various embodiments, cross-search space beam switching can also be employed. This can enable a control channel with good coverage to be defined in some fall-back SS comprised of high aggregation level control channel candidates, to reconfigure the BPL setting of other SS being more sensitive on the proper beamforming transmission.

Techniques of the second set of embodiments can enable dynamic beam switching for data and control channels in various embodiments. In particular, beam switching activation delay between control channel and scheduled data in the same slot can be addressed via a carefully selected start OFDM symbol of the data. Since the start OFDM symbol for the data has been agreed to be signaled in DCI in 3GPP, there is very little additional standardization involved in adopting techniques of the second set of embodiments. The three-part beam reconfiguration for the control channel SS enables the SS beam reconfiguration to be performed on a PHY slot timing level so that beam reconfiguration can be realized in a more agile manner than the L2 timer based method discussed above. Furthermore, the hand-shake procedure built into the three-part approach of the second set of aspects significantly reduces the risk of beam misalignment due to the transmission errors or packet loss when compared with existing techniques.

In various embodiments, one of two techniques can be employed to dynamically signal the beam switching for scheduled data and the SS of the scheduling control channel: (a) separate beam indication fields or (b) a common beam indication field.

Separate beam indication fields: In this technique, two information fields related to beam indication, referred to herein as BI_SS (Beam Indication—Search Space) and BI_Data (Beam Indication—Data), can be added in DCI (e.g., generated by processor(s) 510, transmitted via communication circuitry 520, received via transceiver circuitry 420, and processed by processor(s) 410) to signal the beam switching for control channel SS and scheduled data, respectively. By comprising two separate beam indication fields, the beam switching for data and control channel SS can be signaled simultaneously. In embodiments wherein different sets of BPLs are maintained for the control channel and the data channel, the number of bits for BI_SS and BI_Data can be different due to different sizes of BPL sets for the control and data channels.

Common beam indication field: in this technique, to save the control channel signaling overhead, a single information field related to beam indication (BI) can be included in DCI (e.g., generated by processor(s) 510, transmitted via communication circuitry 520, received via transceiver circuitry 420, and processed by processor(s) 410), preceded with a one bit flag indicating the beam switching to be applied to control SS or scheduled data channel. The format of this BI field can be as follows. BI Field={Flag, Beam index} where Flag values of 0 and 1 refer to data and control SS, respectively (or vice versa). The beam index refers to the updated beam index maintained in the set of BPLs indicated via the Flag.

To address the beam switching activation delay for the scheduled data and control channel SS, one or more of the following three techniques can be employed: (a) Adjustable start OFDM symbol for data to cope with beam switching activation delay; (b) Three-part dynamic beam reconfiguration for the control channel SS; or (c) Dynamic cross-SS BPL reconfiguration.

Adjustable start OFDM symbol for data to cope with beam switching activation delay: In this technique, when a control channel schedules (e.g., via DCI generated by processor(s) 510, transmitted via communication circuitry 520, received via transceiver circuitry 420, and processed by processor(s) 410) a data channel in the same slot with different BPL than that used for the control channel, the start OFDM symbol of the data channel can be signaled by the control channel, which can thereby create an interval of one or more OFDM symbols between the end of control reception and the start of scheduled data. The time interval between the end of control and the start of the scheduled data addresses the delay for control channel decoding and analog beam switching. In various embodiments, the supported set of time intervals can be defined in the standard, and a UE can signal a preferred value to the network as part of UE capability (e.g., related to control channel decoding and analog beam switching).

Three-part dynamic beam reconfiguration for the control channel SS: In this technique, to dynamically reconfigure the BPL for the search space, as described above, a reconfigured beam index can be signaled in the DCI via one of the two techniques discussed above (e.g., separate or common). Referring to FIG. 18, illustrated is a diagram of an example three-part method that can be employed for dynamic reconfiguration of a control channel SS, according to various aspects discussed herein. To avoid beam misalignment due to transmission errors, the three-part approach shown in FIG. 18 can be employed: (a) The DCI (e.g., generated by processor(s) 510, transmitted via communication circuitry 520, received via transceiver circuitry 420, and processed by processor(s) 410) schedules a DL data and also indicates the beam switching for the control channel SS; (b) the UE sends the ACK/NACK response (e.g., generated by processor(s) 410, transmitted via transceiver circuitry 420, received via communication circuitry 520, and processed by processor(s) 510) back to the NW (Network), and requests DL RS with beam direction signaled in the DCI in part a, then the UE starts to monitor the requested DL RS (e.g., via processor(s) 410 and transceiver circuitry 420) in a time window that is one of specified, configured, or chosen by the UE and signaled to the NW; and (c) upon the reception of the ACK/NACK response as well as the DL RS scheduling request from the UE, the NW schedules a DL RS transmission within the time window (e.g., via DCI generated by processor(s) 510, transmitted via communication circuitry 520, received via transceiver circuitry 420, and processed by processor(s) 410), which can be specified, configured, or chosen and signaled from the UE.

After transmitting the DL RS with the new beam, the NW can start to apply the new beam for control channel transmission (e.g., generated by processor(s) 510, transmitted via communication circuitry 520, received via transceiver circuitry 420, and processed by processor(s) 410). After the reception of the requested DL RS, the UE can also apply (e.g., via processor(s) 410 and transceiver circuitry 420) the new beam index for the BPL associated with the control channel SS. In scenarios involving any transmission errors in first two steps, both the NW and UE continue to use the old beam. Additionally, given that the new beam is properly selected by NW according to some beam management procedure, there is a very small likelihood that the UE is not able to detect the DL RS with the new beam sent in part c within the considered time window.

Dynamic cross-SS BPL reconfiguration: In this technique, as an optional extension to the three-part dynamic beam reconfiguration discussed above, where beam switching is applied to the SS of the scheduling control channel, dynamic beam switching signaled by the scheduling DCI can be applied to the other SS(s) configured to the UE which can be configured with several control channel SS(s). This can be realized by adding the SS index to the beam index indication associated with control channel beam index. In such embodiments, the beam index field for the control channel can have the following format: BI field for control channel={SS index, beam index} where the SS index refers to the SS to which the new beam shall be applied, and the beam index defines the new beam to be used.

Additional Embodiments

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

A first example embodiment employable in connection with the first set of aspects discussed herein can comprise a system and/or method of wireless communication for a fifth generation (5G) or new radio (NR) system, comprising: transmitting PRACH (e.g., generated by processor(s) 410, transmitted via transceiver circuitry 420, received via communication circuitry 520, and processed by processor(s) 510) by a UE with multiple Tx beams based on a best downlink Tx beam (e.g., as determined by processor(s) 410) from the base station.

A second example embodiment employable in connection with the first set of aspects can comprise the first example embodiment, wherein if the best downlink base station Tx beam is changed during the PRACH repetitions, then the PRACH power is reset (e.g., via processor(s) 410).

A third example embodiment employable in connection with the first set of aspects can comprise the first example embodiment, wherein if the best downlink base station Tx beam is changed during the PRACH repetitions, then the PRACH power ramping (e.g., as determined by processor(s) 410) is the same as the case without best downlink base station Tx beam change.

A fourth example embodiment employable in connection with the first set of aspects can comprise the first example embodiment, wherein the best downlink base station Tx beam can be determined (e.g., via processor(s) 410) based on the measurement of synchronization signal.

A fifth example embodiment employable in connection with the first set of aspects can comprise the first example embodiment, wherein if the best downlink base station Tx beam is changed back to the previously used Tx beam during the PRACH repetitions, then the PRACH power (e.g., as set by processor(s) 410) follows the previously used one.

A sixth example embodiment employable in connection with the first set of aspects can comprise the fifth example embodiment, wherein if the time gap between the last time that the best downlink base station Tx beam (e.g., beam A) and the time that the best downlink base station Tx beam changes back to beam A is smaller than the configured counter, then the PRACH power follows the previously used one (e.g., as determined by processor(s) 410). If not, the PRACH power is reset (e.g., via processor(s) 410).

A seventh example embodiment employable in connection with the first set of aspects can comprise the first example embodiment, wherein if the best downlink base station Tx beam is changed during the PRACH repetitions, then the PRACH power ramping counter is the maximum of 1 and (latest power ramping counter−X), where X is a certain (e.g., non-negative) integer number.

An eighth example embodiment employable in connection with the first set of aspects can comprise the seventh example embodiment, wherein X is one of fixed in the specification, or configured by UE-specific RRC or system information (e.g., generated by processor(s) 510, transmitted via communication circuitry 520, received via transceiver circuitry 420, and processed by processor(s) 410).

A ninth example embodiment employable in connection with the first set of aspects can comprise the first example embodiment, wherein if the best downlink base station Tx beam is changed during the PRACH repetitions, then the PRACH power is reduced (e.g., via processor(s) 410 and transceiver circuitry 420) by a certain power offset Y.

A tenth example embodiment employable in connection with the first set of aspects can comprise the ninth example embodiment, wherein Y is either fixed in the specification, or configured by UE-specific RRC or system information (e.g., generated by processor(s) 510, transmitted via communication circuitry 520, received via transceiver circuitry 420, and processed by processor(s) 410).

An eleventh example embodiment employable in connection with the first set of aspects can comprise the first example embodiment, wherein if the best downlink base station Tx beam is changed during PRACH transmission operations, then the PRACH resource does not change.

A twelfth example embodiment employable in connection with the first set of aspects can comprise a system and/or method of wireless communication for a fifth generation (5G) or new radio (NR) system, comprising: transmitting PRACH by a UE (e.g., generated by processor(s) 410, transmitted via transceiver circuitry 420, received via communication circuitry 520, and processed by processor(s) 510), wherein the repetition of PRACH is based on the number of gNB Rx beams.

A thirteenth example embodiment employable in connection with the twelfth set of aspects can comprise the twelfth example embodiment, wherein, when the number of Rx beam in the gNB is larger than a predefined number, the UE repeats the PRACH transmissions (e.g., via processor(s) 410 and transceiver circuitry 420).

A fourteenth example embodiment employable in connection with the thirteenth set of aspects can comprise the thirteenth example embodiment, wherein during the repetition of PRACH transmissions, the UE does not change the PRACH power ramping counter.

A fifteenth example embodiment employable in connection with the first set of aspects can comprise the thirteenth example embodiment, wherein during the repetition of PRACH transmissions, the UE does not change the transmission power of the PRACH.

A sixteenth example embodiment employable in connection with the first set of aspects can comprise the thirteenth example embodiment, wherein during the repetition of PRACH transmissions, the UE does not change the Tx beam.

A seventeenth example embodiment employable in connection with the first set of aspects can comprise a system and method of wireless communication for a fifth generation (5G) or new radio (NR) system, comprising: constructing PRACH by a UE (e.g., via processor(s) 410) based on the PRACH location.

An eighteenth example embodiment employable in connection with the first set of aspects can comprise the seventeenth example embodiment, wherein the GP length is based at least in part on the location of PRACH inside a slot.

A nineteenth example embodiment employable in connection with the first set of aspects can comprise the seventeenth example embodiment, wherein the CP length is based at least in part on the location of PRACH inside a slot.

A twentieth example embodiment employable in connection with the first set of aspects can comprise the seventeenth example embodiment, wherein both the GP and the CP length are based at least in part on the location of PRACH inside a slot.

A first example embodiment employable in connection with the second set of aspects can comprise a system and/or method employable at a UE or BS (e.g., gNB), wherein two information fields, namely BI_SS and BI_Data, related to beam indications are added in DCI (e.g., generated by processor(s) 510, transmitted via communication circuitry 520, received via transceiver circuitry 420, and processed by processor(s) 410) to signal the beam switching for control channel SS and scheduled data, respectively.

A second example embodiment employable in connection with the second set of aspects can comprise the first example embodiment, wherein by virtue of the two separate beam indication fields, the beam switching for data and control channel SS can be signaled simultaneously.

A third example embodiment employable in connection with the second set of aspects can comprise the first example embodiment, wherein different sets of BPLs are maintained for control channel and data channel, and wherein the number of bits for BI_SS and BI_Data can be different due to different sizes of BPL sets for control and data channel.

A fourth example embodiment employable in connection with the second set of aspects can comprise a system and/or method employable at a UE or BS (e.g., gNB), wherein one information field related to beam indication (BI) can be included in DCI (e.g., generated by processor(s) 510, transmitted via communication circuitry 520, received via transceiver circuitry 420, and processed by processor(s) 410), wherein the one information field related to BI is preceded with a one bit flag indicating whether the beam switching is to be applied to control SS or scheduled data channel.

A fifth example embodiment employable in connection with the second set of aspects can comprise the fourth example embodiment, wherein the format of the BI field can be as follows: BI Field={Flag, Beam index} where Flag of 0 and 1 refers to data and control SS, respectively, and wherein the beam index refers to the updated beam index maintained in the set of BPLs.

A sixth example embodiment employable in connection with the second set of aspects can comprise a system and/or method employable at a UE or BS (e.g., gNB), wherein, when a control channel schedules a data channel in the same slot with different BPL than that used for the control channel (e.g., generated by processor(s) 510, transmitted via communication circuitry 520, received via transceiver circuitry 420, and processed by processor(s) 410), the start OFDM symbol of the data channel is signaled by the control channel, and is assigned to create a one or several OFDM symbol interval between the end of control reception and the start of scheduled data.

A seventh example embodiment employable in connection with the second set of aspects can comprise the sixth example embodiment, wherein the time interval between the end of control and the start of the scheduled data addresses the delay for control channel decoding and analog beam switching.

An eighth example embodiment employable in connection with the second set of aspects can comprise the sixth example embodiment, wherein the supported set of time intervals can be defined in the standard, and the UE can signal the preferred value to the network (e.g., via signaling generated by processor(s) 410, transmitted via transceiver circuitry 420, received via communication circuitry 520, and processed via processor(s) 510) as part of UE capability (related to control channel decoding and analog beam switching).

A ninth example embodiment employable in connection with the second set of aspects can comprise a system and/or method employable at a UE or BS (e.g., gNB), wherein the DCI (e.g., generated by processor(s) 510, transmitted via communication circuitry 520, received via transceiver circuitry 420, and processed by processor(s) 410) schedules a DL data and also indicates the beam switching for the control channel SS.

A tenth example embodiment employable in connection with the second set of aspects can comprise the ninth example embodiment, wherein the UE sends an ACK/NACK response (e.g., generated by processor(s) 410, transmitted via transceiver circuitry 420, received via communication circuitry 520, and processed via processor(s) 510) back to the NW, and requests DL RS with beam direction signaled in the DCI.

An eleventh example embodiment employable in connection with the second set of aspects can comprise the ninth example embodiment, wherein the UE starts to monitor (e.g., via processor(s) 410 and transceiver circuitry 420) the requested DL RS in a specified or configured time window.

A twelfth example embodiment employable in connection with the second set of aspects can comprise the eleventh example embodiment, wherein, upon the reception of the ACK/NACK response as well as the DL RS scheduling request from the UE, the NW schedules a DL RS transmission within the specified/configured time window (e.g., generated by processor(s) 510, transmitted via communication circuitry 520, received via transceiver circuitry 420, and processed by processor(s) 410).

A thirteenth example embodiment employable in connection with the second set of aspects can comprise the eleventh example embodiment, wherein the time window can be chosen by the UE and signaled to the NW (e.g., generated by processor(s) 410, transmitted via transceiver circuitry 420, received via communication circuitry 520, and processed via processor(s) 510).

A fourteenth example embodiment employable in connection with the second set of aspects can comprise the ninth example embodiment, wherein, after transmitting the DL RS with new beam, NW starts to apply the new beam for control channel transmission.

A fifteenth example embodiment employable in connection with the second set of aspects can comprise the eleventh example embodiment, wherein after the reception of requested DL RS, the UE will also apply the new beam index for the BPL associated with control channel SS.

A sixteenth example embodiment employable in connection with the second set of aspects can comprise any of the ninth through fifteenth example embodiments, wherein, In case of any transmission errors in the first two steps (the tenth or twelfth example embodiments), both the NW and UE shall continue to use the old beam.

A seventeenth example embodiment employable in connection with the second set of aspects can comprise any of the ninth through sixteenth example embodiments, wherein, when beam switching is applied to the SS of the scheduling control channel, dynamic beam switching signaled by the scheduling DCI can be applied to the other SS configured to the UE which can be configured with several control channel SS(s).

An eighteenth example embodiment employable in connection with the second set of aspects can comprise the seventeenth example embodiment, wherein this can be realized by adding the SS index to the beam index indication associated with the control channel beam index.

A nineteenth example embodiment employable in connection with the second set of aspects can comprise the eighteenth example embodiment, wherein the beam index field for the control channel has the following format: BI field for control channel={SS index, beam index} where the SS index refers to the SS to which the new beam shall be applied, and the beam index defines the new beam to be used.

Example 1 is an apparatus configured to be employed in a UE (User Equipment), comprising: a memory interface; and processing circuitry configured to: determine an initial best DL (Downlink) Tx (Transmit) beam based on a first set of one or more SS (Synchronization Signal) bursts; generate, based on the initial best DL Tx beam, a first set of one or more repetitions of a PRACH (Physical Random Access Channel) for one or more UL (Uplink) Tx beams based on the initial best DL Tx beam; determine a revised best DL Tx beam based on a second set of one or more SS bursts, wherein the revised best DL Tx is different from the initial best DL Tx beam; determine a power for a second set of one or more repetitions of the PRACH for the one or more UL Tx beams based at least in part on at least one of: a revised value of a PRACH power ramping counter for the revised best DL Tx beam that is determined based at least in part on a current value of the PRACH power ramping counter for the initial best DL Tx beam; or a PRACH power offset Y; generate the second set of one or more repetitions of the PRACH; and send a first indicator of the initial best DL Tx beam and a second indicator of the revised best DL Tx beam to a memory via the memory interface.

Example 2 comprises the subject matter of any variation of any of example(s) 1, wherein the power for the second set is determined based at least in part on the revised value of the PRACH power ramping counter, and wherein the revised value of the PRACH power ramping counter is equal to the maximum of 1 and the current value minus X, wherein X is a non-negative integer.

Example 3 comprises the subject matter of any variation of any of example(s) 2, wherein X is one of fixed in a specification, configured via UE-specific RRC (Radio Resource Control) signaling, or configured via system information.

Example 4 comprises the subject matter of any variation of any of example(s) 2, wherein X is 0.

Example 5 comprises the subject matter of any variation of any of example(s) 1-4, wherein the power for the second set is determined based at least in part on the PRACH power offset Y, wherein the power for the second set is equal to a current power for the first set reduced by the PRACH power offset Y.

Example 6 comprises the subject matter of any variation of any of example(s) 5, wherein the PRACH power offset Y is one of fixed in a specification, configured via UE-specific RRC (Radio Resource Control) signaling, or configured via system information.

Example 7 is an apparatus configured to be employed in a UE (User Equipment), comprising: a memory interface; and processing circuitry configured to: processing a DCI (Downlink Control Information) message that comprises one or more beam indication fields, wherein each beam indication field of the one or more beam indication fields comprises an associated beam index that indicates, for an associated channel, an associated beam of an associated BPL (Beam Pair Link), wherein the associated channel for each beam indication field of the one or more beam indication fields is one of a data channel or a first control SS (Search Space); and send, for each beam indication field of the one or more beam indication fields, the associated beam index to a memory via the memory interface.

Example 8 comprises the subject matter of any variation of any of example(s) 7, wherein the one or more beam indication fields comprises a first beam indication field and a second beam indication field, wherein the associated channel of the first beam indication field is the data channel, and wherein the associated channel of the second beam indication field is the first control SS.

Example 9 comprises the subject matter of any variation of any of example(s) 8, wherein the associated set of BPLs of the first beam indication field has a first size, wherein the associated set of BPLs of the second beam indication field has a second size, wherein the first size is different from the second size, wherein the associated beam index of the first beam indication field comprises a first number of bits, wherein the associated beam index of the second beam indication field comprises a second number of bits, and wherein the first number of bits is distinct from the second number of bits.

Example 10 comprises the subject matter of any variation of any of example(s) 7, wherein the one or more beam indication fields comprises a single beam indication field, wherein the single beam indication field comprises the associated beam index of the single beam indication field preceded by a flag that comprises one bit that indicates whether the associated channel for the single beam indication field is the data channel or the first control SS.

Example 11 comprises the subject matter of any variation of any of example(s) 10, wherein the single beam indication field has a format of {Flag, Associated Beam Index}, wherein the flag indicates the data channel when the flag has a value of 0, and wherein the flag indicates the first control SS when the flag has a value of 1.

Example 12 comprises the subject matter of any variation of any of example(s) 7-11, wherein the DCI schedules the data channel in the same slot as the first control SS, wherein the first control SS comprises the DCI, wherein for the data channel the associated BPL is a first BPL, wherein for the first control SS the associated BPL is a second BPL, wherein the first BPL is different from the second BPL, wherein a start symbol of the data channel is signaled by the DCI, and wherein there is an interval of one or more symbols between an end symbol of the first control SS and the start symbol of the data channel.

Example 13 comprises the subject matter of any variation of any of example(s) 12, wherein, during the interval of the one or more symbols, the processing circuitry is further configured to: decode the first control SS; and perform analog beam switching between the first BPL and the second BPL.

Example 14 comprises the subject matter of any variation of any of example(s) 12, wherein the interval is a selected interval of a plurality of predefined intervals, and wherein the processing circuitry is further configured to generate UE capability signaling that indicates a preferred interval of the plurality of predefined intervals.

Example 15 comprises the subject matter of any variation of any of example(s) 7-11, wherein the one or more beam indication fields comprises a first beam indication field, wherein the associated channel of the first beam indication field is the first control SS, and wherein the DCI schedules the data channel.

Example 16 comprises the subject matter of any variation of any of example(s) 15, wherein the processing circuitry is further configured to generate a response to the DCI, wherein the response comprises an ACK (Acknowledgement)/NACK (Negative Acknowledgement) for the DCI, and wherein the response comprises a request for DL (Downlink) RS (Reference Signal(s)) on a beam corresponding to the associated beam index indicated in the first beam indication field.

Example 17 comprises the subject matter of any variation of any of example(s) 16, wherein the processing circuitry is further configured to monitor the requested DL RS in a time window.

Example 18 comprises the subject matter of any variation of any of example(s) 17, wherein the time window is one of predefined in a specification or configured via signaling.

Example 19 comprises the subject matter of any variation of any of example(s) 16, wherein the processing circuitry is further configured to: select the time window; and generate signaling that indicates the time window.

Example 20 comprises the subject matter of any variation of any of example(s), wherein the requested DL RS are detected in the time window, and wherein the processing circuitry is further configured to apply, for the first control SS, the associated BPL of the associated beam of the associated beam index indicated by the first beam indication field.

Example 21 comprises the subject matter of any variation of any of example(s) 16, wherein the requested DL RS are not detected in the time window, and wherein the processing circuitry is further configured to maintain a previously applied BPL for the first control SS.

Example 22 comprises the subject matter of any variation of any of example(s) 15, wherein the UE is configured with a plurality of control SSs comprising the first control SS and a second control SS different than the first control SS, and wherein the second control SS comprises the DCI.

Example 23 comprises the subject matter of any variation of any of example(s) 22, wherein the first beam indication field comprises a SS index that indicates the first control SS.

Example 24 comprises the subject matter of any variation of any of example(s) 23, wherein the first beam indication field has a format of {SS index, Associated Beam Index}, wherein the first beam indication field comprises the SS index followed by the associated beam index.

Example 25 is an apparatus configured to be employed in a gNB (next generation Node B), comprising: a memory interface; and processing circuitry configured to: generating a DCI (Downlink Control Information) message that comprises one or more beam indication fields, wherein each beam indication field of the one or more beam indication fields comprises an associated beam index that indicates, for an associated channel, an associated beam of an associated BPL (Beam Pair Link), wherein the associated channel for each beam indication field of the one or more beam indication fields is one of a data channel or a first control SS (Search Space); and send, for each beam indication field of the one or more beam indication fields, the associated beam index to a memory via the memory interface.

Example 26 comprises the subject matter of any variation of any of example(s) 25, wherein the one or more beam indication fields comprises a first beam indication field, wherein the associated channel of the first beam indication field is the first control SS, and wherein the DCI schedules the data channel.

Example 27 comprises the subject matter of any variation of any of example(s) 26, wherein the processing circuitry is further configured to process a response to the DCI, wherein the response comprises an ACK (Acknowledgement)/NACK (Negative Acknowledgement) for the DCI, and wherein the response comprises a request for DL (Downlink) RS (Reference Signal(s)) on a beam corresponding to the associated beam index indicated in the first beam indication field.

Example 28 comprises the subject matter of any variation of any of example(s) 27, wherein the processing circuitry is further configured to schedule the requested DL RS on the beam in a time window.

Example 29 comprises the subject matter of any variation of any of example(s) 28, wherein, after transmission of the requested DL RS in the time window, the processing circuitry is further configured to configured to apply, for the first control SS, the associated BPL of the associated beam of the associated beam index indicated by the first beam indication field.

Example 30 comprises an apparatus comprising means for executing any of the described operations of examples 1-29.

Example 31 comprises a machine readable medium that stores instructions for execution by a processor to perform any of the described operations of examples 1-29.

Example 32 comprises an apparatus comprising: a memory interface; and processing circuitry configured to: perform any of the described operations of examples 1-29.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a UE (User Equipment), comprising:
    a memory interface; and
    processing circuitry configured to:
        processing a Downlink Control Information (DCI) message that comprises one or more beam indication fields, wherein each beam indication field of the one or more beam indication fields comprises an associated beam index that indicates, for an associated channel, an associated beam of an associated Beam Pair Link (BPL), wherein the associated channel for each beam indication field of the one or more beam indication fields is one of a data channel or a first control Search Space (SS); and
        send, for each beam indication field of the one or more beam indication fields, the associated beam index to a memory via the memory interface.

2. The apparatus of claim 1, wherein the one or more beam indication fields comprises a first beam indication field and a second beam indication field, wherein the associated channel of the first beam indication field is the data channel, and wherein the associated channel of the second beam indication field is the first control SS.

3. The apparatus of claim 2, wherein the BPL of the first beam indication field has a first size, and the BPL of the second beam indication field has a second size, wherein the first size is different from the second size, wherein the associated beam index of the first beam indication field comprises a first number of bits, wherein the associated beam index of the second beam indication field comprises a second number of bits, and wherein the first number of bits is distinct from the second number of bits.

4. The apparatus of claim 1, wherein the one or more beam indication fields comprises a single beam indication field, wherein the single beam indication field comprises the associated beam index of the single beam indication field preceded by a flag that comprises one bit that indicates whether the associated channel for the single beam indication field is the data channel or the first control SS, and
    the single beam indication field has a format of {Flag, Associated Beam Index}, wherein the flag indicates the data channel when the flag has a value of 0, and wherein the flag indicates the first control SS when the flag has a value of 1.

5. The apparatus of claim 1, wherein the DCI schedules the data channel in a same slot as the first control SS, wherein the first control SS comprises the DCI, wherein for the data channel the associated BPL is a first BPL, wherein for the first control SS the associated BPL is a second BPL, wherein the first BPL is different from the second BPL, wherein a start symbol of the data channel is signaled by the DCI, and wherein there is an interval of one or more symbols between an end symbol of the first control SS and the start symbol of the data channel.

6. The apparatus of claim 5, wherein, during the interval of the one or more symbols, the processing circuitry is further configured to:
    decode the first control SS; and
    perform analog beam switching between the first BPL and the second BPL.

7. The apparatus of claim 5, wherein the interval is a selected interval of a plurality of predefined intervals, and wherein the processing circuitry is further configured to generate UE capability signaling that indicates a preferred interval of the plurality of predefined intervals.

8. A baseband processor of a UE (User Equipment), comprising:
    one or more processors configured to:
        receive a Downlink Control Information (DCI) message that comprises one or more beam indication fields, wherein each beam indication field of the one or more beam indication fields comprises an associated beam index that indicates, for an associated channel, an associated beam of an associated Beam Pair Link (BPL), wherein the associated channel for each beam indication field of the one or more beam indication fields is one of a data channel or a first control Search Space (SS); and generate a response after receiving the DCI, wherein the response is an acknowledgement (ACK) or a negative acknowledgement (NACK).

9. The baseband processor of claim 8, wherein the one or more beam indication fields comprises a first beam indication field, wherein the associated channel of the first beam indication field is the first control SS, and wherein the DCI schedules the data channel.

10. The baseband processor of claim 9, wherein the response comprises a request for Downlink (DL) Reference Signal(s) (RS) on a beam corresponding to the associated beam index indicated in the first beam indication field.

11. The baseband processor of claim 10, wherein the one or more processors are further configured to monitor the requested DL RS in a time window.

12. The baseband processor of claim 11, wherein the one or more processors are further configured to:
select the time window; and
generate signaling that indicates the time window.

13. The baseband processor of claim 11, wherein the requested DL RS are detected in the time window, and wherein the one or more processors are further configured to apply, for the first control SS, the associated BPL of the associated beam of the associated beam index indicated by the first beam indication field.

14. The baseband processor of claim 11, wherein the requested DL RS are not detected in the time window, and wherein the one or more processors are further configured to maintain a previously applied BPL for the first control SS.

15. The baseband processor of claim 9, wherein the UE is configured with a plurality of control SSs comprising the first control SS and a second control SS different than the first control SS, and wherein the second control SS comprises the DCI.

16. The baseband processor of claim 15, wherein the first beam indication field comprises a SS index that indicates the first control SS, and the first beam indication field has a format of {SS index, Associated Beam Index}, wherein the first beam indication field comprises the SS index followed by the associated beam index.

17. An apparatus configured to be employed in a Base Station (BS), comprising:
a memory interface; and
processing circuitry configured to:
generating a Downlink Control Information (DCI) message that comprises one or more beam indication fields, wherein each beam indication field of the one or more beam indication fields comprises an associated beam index that indicates, for an associated channel, an associated beam of an associated Beam Pair Link (BPL), wherein the associated channel for each beam indication field of the one or more beam indication fields is one of a data channel or a first control Search Space (SS); and
send, for each beam indication field of the one or more beam indication fields, the associated beam index to a memory via the memory interface.

18. The apparatus of claim 17, wherein the one or more beam indication fields comprises a first beam indication field, wherein the associated channel of the first beam indication field is the first control SS, and wherein the DCI schedules the data channel.

19. The apparatus of claim 18, wherein the processing circuitry is further configured to process a response to the DCI, wherein the response comprises an Acknowledgement (ACK)/Negative Acknowledgement (NACK) for the DCI, and wherein the response comprises a request for Downlink (DL) Reference Signal(s) (RS) on a beam corresponding to the associated beam index indicated in the first beam indication field.

20. The apparatus of claim 19, wherein the processing circuitry is further configured to schedule the requested DL RS on the beam in a time window, and after transmission of the requested DL RS in the time window, the processing circuitry is further configured to apply, for the first control SS, the associated BPL of the associated beam of the associated beam index indicated by the first beam indication field.

* * * * *